US010205501B2

(12) United States Patent
Chen et al.

(10) Patent No.: US 10,205,501 B2
(45) Date of Patent: Feb. 12, 2019

(54) APPARATUS AND METHOD IN WIRELESS COMMUNICATION SYSTEM USING MULTI-USER SUPERPOSITION TRANSMISSION

(71) Applicant: SONY CORPORATION, Tokyo (JP)

(72) Inventors: Jinhui Chen, Beijing (CN); Xin Guo, Beijing (CN); Chen Sun, Beijing (CN)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/561,662

(22) PCT Filed: Nov. 4, 2016

(86) PCT No.: PCT/CN2016/104705
§ 371 (c)(1),
(2) Date: Sep. 26, 2017

(87) PCT Pub. No.: WO2017/076354
PCT Pub. Date: May 11, 2017

(65) Prior Publication Data
US 2018/0076866 A1    Mar. 15, 2018

(30) Foreign Application Priority Data

Nov. 5, 2015 (CN) .......................... 2015 1 0745034

(51) Int. Cl.
*H04L 27/26* (2006.01)
*H04B 7/06* (2006.01)
(Continued)

(52) U.S. Cl.
CPC ............ *H04B 7/06* (2013.01); *H04B 7/0615* (2013.01); *H04L 1/0009* (2013.01); *H04L 25/02* (2013.01);
(Continued)

(58) Field of Classification Search
CPC .... H04B 7/0452; H04B 7/0413; H04L 27/261
See application file for complete search history.

(56) References Cited

U.S. PATENT DOCUMENTS

2013/0343477 A9 * 12/2013 Jia ............................ H04J 11/00
375/295
2014/0233466 A1 * 8/2014 Pourahmadi .......... H04L 5/0051
370/329
(Continued)

FOREIGN PATENT DOCUMENTS

CN          101932096 A     12/2010
CN          104486035 A      4/2015
(Continued)

OTHER PUBLICATIONS

Sony Corporation, "Control signaling on DMRS pairing for MUST," 3GPP TSG RAN WG1 meeting #83, R1-156707, Nov. 15-22, 2015, (3 pages).
(Continued)

*Primary Examiner* — Salvador E Rivas
(74) *Attorney, Agent, or Firm* — Xsensus, LLP

(57) ABSTRACT

Aspects of the disclosure include an apparatus at base station side in a wireless communication system for multi-user superposition transmission. The apparatus includes a superposition control unit and an indication generation unit. The superposition control unit is configured to insert, into a data stream of each user equipment in a group of user equipment comprising a plurality of user equipment, a demodulation reference signal corresponding to the data stream, and superpose demodulation reference signals corresponding to data streams of respective user equipment. The indication generation unit is configured to generate, for at least a first user equipment among the plurality of user equipment, an indication regarding a demodulation reference signal corresponding to a data stream of other user equipment among the
(Continued)

plurality of user equipment, to assist the first user equipment in demodulating data transmitted in the multi-user superposition transmission.

19 Claims, 18 Drawing Sheets

(51) Int. Cl.
  *H04L 25/02* (2006.01)
  *H04L 1/00* (2006.01)
  *H04L 27/34* (2006.01)
  *H04B 7/0413* (2017.01)
  *H04B 7/0452* (2017.01)
  *H04B 7/0456* (2017.01)

(52) U.S. Cl.
  CPC ........ *H04L 27/261* (2013.01); *H04L 27/3488* (2013.01); *H04B 7/0413* (2013.01); *H04B 7/0452* (2013.01); *H04B 7/0456* (2013.01); *H04L 25/022* (2013.01); *H04L 25/0224* (2013.01)

(56) References Cited

U.S. PATENT DOCUMENTS

| | | | |
|---|---|---|---|
| 2016/0029350 A1 | 1/2016 | Kishiyama et al. | |
| 2016/0065351 A1 | 3/2016 | Zhang et al. | |
| 2016/0174230 A1 | 6/2016 | Benjebbour et al. | |
| 2016/0309542 A1* | 10/2016 | Kowalski | H04W 76/27 |
| 2016/0337019 A1 | 11/2016 | Chung et al. | |
| 2018/0160401 A1* | 6/2018 | Goto | H04B 1/04 |

FOREIGN PATENT DOCUMENTS

| | | |
|---|---|---|
| JP | 2014064280 A | 4/2014 |
| JP | 2014154962 A | 8/2014 |
| JP | 5607807 B2 | 10/2014 |
| JP | 2015012458 A | 1/2015 |
| JP | 2015525023 A | 8/2015 |
| WO | 2013175419 A1 | 11/2013 |
| WO | 2014/179953 A1 | 11/2014 |
| WO | 2016/168732 A1 | 10/2016 |
| WO | 2017/030496 | 2/2017 |

OTHER PUBLICATIONS

International Search Report dated Jan. 24, 2017 in PCT/CN2016/104705 filed Nov. 4, 2016.
Written Opinion of the International Searching Authority issued in International Application No. PCT/CN2016/104705 dated Jan. 24, 2017 (with English translation).
LG Electronics et al., "WF on Potential Assistance Information for MUST UE," 3GGP TSG RAN WG1 Meeting W82bis R1-156221, Oct. 9, 2015.
Grounds for Rejection (Summary) issued in Japanese Application 2017-546719 dated Jan. 25, 2018.
Notification of Reasons for Refusal (Final) issued in Japanese Application 2017-546719 dated May 2, 2018.
Itl, "High Level Signalling of NOMA for Multiuser Superposition Transmission", 3GPP TSG-RAN WG1#82 R1-154547, 4 Pages total, (Aug. 28, 2015).
LG Electronics, "Discussion on Multiuser Superposition Schemes and Signaling Schemes", 3GPP TSG-RAN WG1#82 R1-154282, 5 Pages total, (Aug. 28, 2015).
Samsung, "Bit to Symbol Mapping for Multiuser Superposition Transmission", 3GPP TSG-RAN WG1#82 R1-154184, 10 Pages total, (Aug. 28, 2015).
Nonaka, N., et al., "System-Level Throughput of NOMA Using Intra-beam Superposition Coding and SIC in MIMO Downlink When Channel Estimation Error Exists", IEICE Technical Report RCS2014-256, 114(372), 8 Pages total, (Dec. 11, 2014).
Korean Office Action dated Sep. 20, 2018 in Korean Application No. 10-2018-7013890.
"Views on Downlink Multiuser Superposition Transmission", 3GPP TSG RAN WG1 #82, CMCC, R1-154306, (available on server: Aug. 15, 2015).
"Discussion on the DL superposed transmissions schemes", 3GPP TSG RAN WG1 #82bis, Nokia Networks, R1-155893 (available on server: Sep. 25, 2015).
Extended European Search Report dated Oct. 4, 2018 in European Application No. 16861622.
"Multiuser Superposition Transmission Scheme for LTE" 3GPP TSG RAN WG1 Meeting #82, R1-154454, MediaTek Inc., Beijing, China, Aug. 24th-28th, 2015.

* cited by examiner

APPARATUS AND METHOD IN WIRELESS COMMUNICATION SYSTEM USING MULTI-USER SUPERPOSITION TRANSMISSION

This application claims the benefit of priority of the Chinese Patent Application No. 201510745034.8 filed with the Chinese State Intellectual Property Office on Nov. 5, 2015 and entitled "APPARATUS AND METHOD IN WIRELESS COMMUNICATION SYSTEM", the entire disclosure of which is incorporated herein by reference.

FIELD

The disclosure relates to the field of wireless communication technology, and particularly to an apparatus and a method at base station side as well as an apparatus and a method at user equipment side regarding demodulation reference signal transmission in a wireless communication system for multi-user superposition transmission (MUST).

BACKGROUND

In existing 3GPP, a base station inserts a demodulation reference signal into a data stream of user equipment, and notifies the user equipment. A transmission power of a data stream of the user is the same as a transmission power of the demodulation reference signal of the user. It is to be noted that, in some examples, the demodulation reference signal may also be referred to as a user specific reference signal, and the data stream may also be referred to as a data layer. In multi-user superposition transmission, the existing transmission manner of the demodulation reference signal has the following defects: 1) the base station needs to notify a power allocation coefficient to at least one user equipment, and since the power allocation coefficient may be dynamically adjusted according to a channel condition, the dynamic notification of the power allocation coefficient results in higher signaling overhead, and 2) the transmission power allocated to the demodulation reference signal of each user equipment is only a partial power, thus the quality of equivalent channel estimation is affected.

SUMMARY

A brief summary of the disclosure will be given below to provide basic understanding of some aspects of the disclosure. However, it shall be appreciated that this summary is neither exhaustively descriptive of the disclosure nor intended to define essential or important components or the scope of the disclosure but is merely for the purpose of presenting some concepts of the disclosure in a simplified form and hereby acts as a preamble of more detailed descriptions which will be presented later.

In view of the above problem, it is an object of the present disclosure to provide an apparatus and a method at base station side, and an apparatus and a method at user equipment side in a wireless communication system for multi-user superposition transmission, which can overcome the above defects in the conventional technology, avoid the great signaling overhead due to the notification of the power allocation coefficient, and achieve transmission of the demodulation reference signal with a full power to improve the channel estimation quality.

According to an aspect of the present disclosure, it is provided an apparatus at base station side in a wireless communication system for multi-user superposition transmission, which includes: a superposition control unit configured to insert, into a data stream of each user equipment in a group of user equipment comprising a plurality of user equipment, a demodulation reference signal corresponding to the data stream, and superpose demodulation reference signals corresponding to data streams of respective user equipment, wherein the superposition control unit allocates a specific transmission power to the data stream of each of the plurality of user equipment, so that the data streams of respective user equipment are transmitted to the plurality of user equipment with same time-frequency resource, without using a multiple-input multiple-output performance gain and/or code division multiplexing; and an indication generation unit configured to generate, for at least a first user equipment among the plurality of user equipment, an indication regarding a demodulation reference signal corresponding to a data stream of other user equipment among the plurality of user equipment, to assist the first user equipment in demodulating data transmitted in the multi-user superposition transmission.

According to a preferred embodiment of the present disclosure, the demodulation reference signals corresponding to the data streams of respective user equipment have different orthogonal codes, so that the demodulation reference signals corresponding to the data streams of respective user equipment are transmitted to the respective user equipment on same resource elements.

According to another preferred embodiment of the present disclosure, each of the plurality of user equipment has only a single layer of data stream, and the superposition control unit is configured to insert a demodulation reference signal which supports only a single-layer data stream into the data stream of each of the plurality of user equipment.

According to another preferred embodiment of the present disclosure, the superposition control unit is further configured to allocate a specific transmission power to the demodulation reference signal corresponding to the data stream of each of the plurality of user equipment, and superpose the demodulation reference signals corresponding to the data streams of respective user equipment according to the allocated transmission powers.

According to another preferred embodiment of the present disclosure, the demodulation reference signals corresponding to the data streams of respective user equipment are superposed in a manner different from a manner in which the data streams of respective user equipment are superposed.

According to another preferred embodiment of the present disclosure, the transmission power allocated to the demodulation reference signal corresponding to the data stream of each of the plurality of user equipment is the same as the transmission power allocated to the data stream.

According to another preferred embodiment of the present disclosure, the indication is included in physical layer singling.

According to another preferred embodiment of the present disclosure, the superposition control unit is further configured to determine, from a plurality of reference signal groups each comprising a plurality of demodulation reference signals, a reference signal group for the group of user equipment, wherein the number of demodulation reference signals comprised in the determined reference signal group is greater than or equal to the number of user equipment comprised in the group of user equipment, and the indication comprises an index regarding the determined reference signal group.

According to another preferred embodiment of the present disclosure, the indication further comprises information on a demodulation reference signal for the first user equipment in the determined reference signal group.

According to another preferred embodiment of the present disclosure, the indication further comprises at least one bit for indicating to user equipment an indication manner regarding the demodulation reference signal, the indication manner comprising a demodulation reference signal group indication manner and a conventional demodulation reference signal indication manner.

According to another preferred embodiment of the present disclosure, the indication generation unit is further configured to use the conventional demodulation reference signal indication manner for at least second user equipment in the group of user equipment.

According to another preferred embodiment of the present disclosure, the apparatus further comprises a storage unit configured to store information on a demodulation reference signal group set which comprises the plurality of reference signal groups, wherein the plurality of demodulation reference signals comprised in each of the plurality of demodulation reference signal groups are orthogonal to each other in a code division manner, and the superposition control unit reads the storage unit to determine the reference signal group for the group of user equipment.

According to another preferred embodiment of the present disclosure, the apparatus is the base station, and the apparatus further comprises: a transmission unit configured to transmit the superposed demodulation reference signal and the indication to at least the first user equipment.

According to another aspect of the present disclosure, it is also provided an apparatus at base station side in a wireless communication system for multi-user superposition transmission, which includes: an insertion control unit configure to insert a common demodulation reference signal into a superposed data stream of a plurality of user equipment; and an indication generation unit configured to generate, for at least a first user equipment among the plurality of user equipment, an indication regarding power allocation coefficients corresponding to data streams of respective user equipment, to assist the first user equipment in demodulating data transmitted in multi-user superposition transmission.

According to another aspect of the present disclosure, it is also provided an apparatus at user equipment side in a wireless communication system for multi-user superposition transmission, which includes: an equivalent channel estimation unit configured to estimate, based on a superposed demodulation reference signal regarding the user equipment and other user equipment and an indication regarding a demodulation reference signal of the other user equipment, which are from a base station, an equivalent channel corresponding to a data stream of the user equipment and an equivalent channel corresponding to a data stream of the other user equipment, wherein a demodulation reference signal regarding the user equipment and the demodulation reference signal regarding the other user equipment are respectively inserted into data streams of respective user equipment, and the data streams of respective user equipment are transmitted by the base station at specific transmission powers with same time-frequency resource, without using a multiple-input multiple-output performance gain and/or code division multiplexing; and a data demodulation unit configured to demodulate data transmitted in multi-user superposition transmission according to the estimated equivalent channels.

According to another aspect of the present disclosure, it is also provided an apparatus at user equipment side in a wireless communication system for multi-user superposition transmission, which includes: an equivalent channel estimation unit configured to estimate, according to a common demodulation reference signal from a base station, an equivalent channel corresponding to a superposed data stream from the base station, wherein the common demodulation reference signal is inserted into the superposed data stream; and a data demodulation unit configured to demodulate data transmitted in multi-user superposition transmission according to the estimated equivalent channel and an indication regarding power allocation coefficients of the user equipment and other user equipment from the base station.

According to another aspect of the present disclosure, it is also provided a method applied at base station side in a wireless communication system for multi-user superposition transmission, which includes: inserting, into a data stream of each user equipment in a group of user equipment comprising a plurality of user equipment, a demodulation reference signal corresponding to the data stream, and superposing demodulation reference signals corresponding to data streams of respective user equipment, wherein a specific transmission power is allocated to the data stream of each of the plurality of user equipment, so that the data streams of respective user equipment are transmitted to the plurality of user equipment with same time-frequency resource, without using a multiple-input multiple-output performance gain and/or code division multiplexing; and generating, for at least a first user equipment among the plurality of user equipment, an indication regarding a demodulation reference signal corresponding to a data stream of other user equipment among the plurality of user equipment, to assist the first user equipment in demodulating data transmitted in the multi-user superposition transmission.

According to another aspect of the present disclosure, it is also provided a method applied at base station side in a wireless communication system for multi-user superposition transmission, which includes: inserting a common demodulation reference signal into a superposed data stream of a plurality of user equipment; and generating, for at least a first user equipment among the plurality of user equipment, an indication regarding power allocation coefficients respectively corresponding to data streams of respective user equipment, to assist the first user equipment in demodulating data transmitted in multi-user superposition transmission.

According to another aspect of the present disclosure, it is also provided a method applied at user equipment side in a wireless communication system for multi-user superposition transmission, which includes: estimating, based on a superposed demodulation reference signal regarding the user equipment and other user equipment and an indication regarding a demodulation reference signal of the other user equipment, which are from a base station, an equivalent channel corresponding to a data stream of the user equipment and an equivalent channel corresponding to a data stream of the other user equipment, wherein a demodulation reference signal regarding the user equipment and the demodulation reference signal regarding the other user equipment are respectively inserted into data streams of respective user equipment, and the data streams of respective user equipment are transmitted by the base station at specific transmission powers with same time-frequency resource, without using a multiple-input multiple-output performance gain and/or code division multiplexing; and demodulating data transmitted in multi-user superposition transmission according to the estimated equivalent channels.

According to another aspect of the present disclosure, it is also provided a method applied at user equipment side in a wireless communication system for multi-user superposition transmission, which includes: estimating, according to a common demodulation reference signal from a base station, an equivalent channel corresponding to a superposed data stream from the base station, wherein the common demodulation reference signal is inserted into the superposed data stream; and demodulating data transmitted in multi-user superposition transmission according to the estimated equivalent channel and an indication regarding power allocation coefficients of the user equipment and other user equipment from the base station.

According to another aspect of the present disclosure, it is further provided an electronic device which may include a transceiver and one or more processors, and the one or more processors may be configured to perform the above methods or functions of corresponding units in the wireless communication system according to the embodiments of the present disclosure.

According to other aspects of the present disclosure, it is further provided computer program codes and a computer program product for implementing the above method according to the present disclosure, and a computer readable storage medium on which the computer program codes for implementing the above method according to the present disclosure are recorded.

According to the embodiments of the present disclosure, as compared with the method in the conventional technology in which the demodulation reference signal is inserted into a data stream of a user to acquire a corresponding equivalent channel, signaling overhead can be reduced by performing superposition transmission on demodulation reference signals of multiple users, and channel estimation with a higher accuracy can be realized by inserting a common demodulation reference signal into the superimposed data stream of the multiple users.

Other aspects of the embodiments of the disclosure will be presented in the following detailed description serving to fully disclose preferred embodiments of the disclosure but not to limit the disclosure.

BRIEF DESCRIPTION OF THE DRAWINGS

The disclosure can be better understood with reference to the detailed description given below in conjunction with the accompanying drawings, throughout which identical or like reference signs denote identical or like components. The accompanying drawings together with the following detailed description are incorporated into and form a part of the specification and serve to further illustrate the preferred embodiments of the disclosure and to explain the principle and advantages of the disclosure by way of example. In the drawings.

DETAILED DESCRIPTION OF THE EMBODIMENTS

Figure 1A:
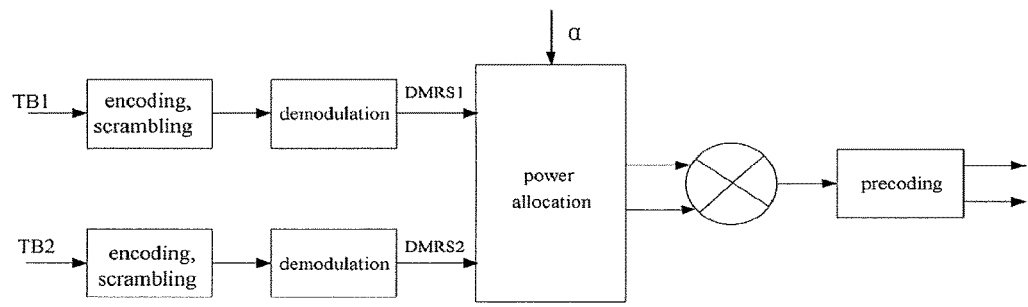
FIG. 1A is a schematic diagram illustrating a first exemplary transmission manner for transmitting a demodulation reference signal in a wireless communication system for multi-user superposition transmission according to an embodiment of the present disclosure.

Exemplary embodiments of the present disclosure will be described below in conjunction with the accompanying drawings. For the sake of clarity and conciseness, not all the features of practical implementations are described in the specification. However, it is to be appreciated that numerous implementation-specific decisions shall be made during developing any of such practical implementations so as to achieve the developer's specific goals, for example, to comply with system- and business-related constraining conditions which will vary from one implementation to another. Moreover, it shall also be appreciated that such a development effort might be very complex and time-consuming but may simply be a routine task for those skilled in the art benefiting from this disclosure.

It shall further be noted that only those device structures and/or process steps closely relevant to the solutions of the disclosure are illustrated in the drawings while other details less relevant to the disclosure are omitted so as not to obscure the disclosure due to those unnecessary details.

The embodiments of the present disclosure are described below with reference to FIGS. 1A to 21.

Before describing the embodiments of the present disclosure in detail, the superposition coding technology serving as a basis of the multi-user superposition transmission according to the present disclosure will be briefly described.

By means of superposition coding, a transmitter is capable of communicating with multiple receivers using same transmission resource. For example, current downlink multi-user superposition transmission can support a base station transmitting multiple data streams to more than one user equipment simultaneously, without making distinction using different time, different frequencies, different codewords, or a multi-antenna technology. As an example, it is considered that a radio transmitter Tx communicates with a first receiver Rx1 via a first physical communication link L1, and the radio transmitter Tx communicates with a receiver Rx2 via a second communication link L2. It is assumed that a radio condition is weaker for the first receiver/link (which is farther from the transmitter, for example), and is stronger for the second receiver/link (which is closer to the transmitter, for example). It is to be noted that this situation may be temporary since the radio condition changes continuously, especially for mobile stations. In other words, for a fixed radio transmission power, a Signal to Interference plus Noise Ratio (SINR) and the Carrier-to-Interference (C/I) ratio of the first receiver is lower (or much lower) than the SINR and C/I ratio of the second transmitter. The transmitter Tx, which has known the relative radio conditions of the two receivers, can proportionally allocate power budgets between the two receivers for a specific time slot and a specific carrier frequency, such that a higher power is used for transmitting a first data block intended for the first receiver Rx1 (a receiver under the weaker radio condition) than that for a second data block intended for the second receiver Rx2 (a receiver under the stronger radio condition). As an example, given a current radio condition and an extra interference due to transmission of the second data block to the second receiver Rx2, the transmitter Tx may use sufficient power for transmitting the first data block intended for the first receiver Rx1, to enable the first receiver Rx1 to decode this block. Then the transmitter Tx may use power, which is smaller but still sufficient to enable the second receiver Rx2 to decode the second data block using interference cancellation used to eliminate or reduce the interference due to the transmission of the first data block, for transmitting the second data block intended for the second receiver Rx2. Then, the transmitter Tx transmits the two data blocks on a same carrier frequency and at a same time instant. Therefore, it can be considered that the two data blocks collide with each other. Since the first data block is transmitted using a higher power allocation than the second data block, the second data block is presented as only a noise or increased interference to the first receiver Rx1. If a power offset between transmissions of the two data blocks is high enough, SINR degradation at the first receiver Rx1 is small and even irrelevant. Therefore, if the first data block is transmitted with sufficient power with respect to a transmission rate of the first data block, the current radio condition and the extra interference caused by the transmission of the second data block, the first receiver Rx1 should be capable of decoding the first data block. The second receiver Rx2 should be also capable of decoding the first data block, since the second receiver Rx2 receives the first data block at a SINR better than the first receiver Rx1 due to the stronger radio condition of the second receiver Rx2. Once the second receiver Rx2 decodes the first data block, the second receiver Rx2 may process the first data block as an interference, and eliminate the interference from a total signal received during a period for receiving the two data blocks using a known interference cancellation technology. The residual signal represents the second data block which is combined with noises and interferences form other sources.

If the second data block is transmitted with sufficient power (which is still lower than the power for the first data block) with respect to a transmission rate of the second data block and the radio condition of the second receiver Rx2, the second receiver Rx2 should be capable of decoding the second data block.

It is to be noted that, the above method can be extended to three or more receivers. For example, a maximum power may be allocated for transmission to a receiver with the weakest radio condition, a minimum power may be allocated for transmission to a receiver under the strongest radio condition, and the an intermediate power may be allocated for a receiver under an intermediate radio condition. The receiver in the strongest radio condition may then decode a data block intended for the receiver in the weakest radio condition, eliminate the decoded block from the received signal, decode a data block intended for the receiver in the intermediate radio condition, eliminate the second decoded block, and finally decode a data block intended for itself (this decoding/elimination process may be referred to as step-by-step interference cancellation). The receiver in the intermediate radio condition may also decode the data block intended for the receiver in the weakest radio condition, eliminate it from the received signal, and then decode the data block intended for itself. The receiver in the weakest radio condition may be able to directly decode the data block intended for itself since the data block is transmitted at the highest power level. It should be understood that, those skilled in the art should be able to extend the step-by-step interference cancellation technology to four or more receivers, without additional testing or further creative labor. The receiver may be a mobile station, such as a user equipment. The transmitter may be a base station transceiver, such as an eNB. The data block may be for example a data packet, or a transport block.

By means of the linear superposition of the signals with different powers, the base station can implement the multi-user superposition transmission to multiple user equipment which are significantly different in terms of channel conditions using same transmission resources. In addition, the base station can also implement the multi-user superposition transmission to multiple user equipment which are significantly different in terms of channel conditions using same transmission resources, by using a non-linear superposition manner of constellation diagram partial mapping. In some embodiments of the non-linear superposition, powers allocated to data streams of respective user equipment may happen to be the same. With the development of the superposition coding technique, the inventor of the present disclosure considers that application of the superposition coding technique to the actual communication system involves the following problems: the overhead that the base station dynamically indicates the transmission power level to the user equipment, and problems such as insertion of a demodulation reference signal and a power allocation manner, since the base station generally inserts the demodulation reference signal into the data in order to assist the user equipment in demodulating the data signal.

In the present disclosure, two methods for transmitting a demodulation reference signal in a wireless communication system for multi-user superposition transmission are mainly proposed. One method is to respectively insert demodulation reference signals into the data streams of respective users and to superimpose and transmit these demodulation reference signals by respectively allocating certain powers to these demodulation reference signals, and the other method is to insert a common demodulation reference signal into the superposed data stream of multiple users and allocate a full power to transmit the common demodulation reference signal.

Figure 1B:
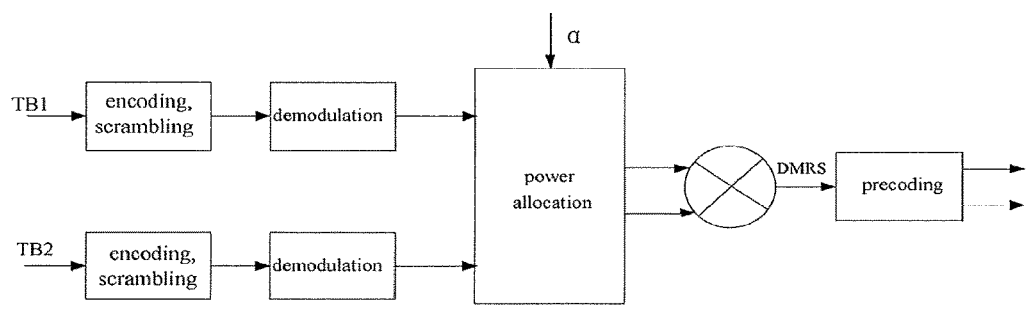
FIG. 1B is a schematic diagram illustrating a second exemplary manner for transmitting a demodulation reference signal in a wireless communication system for multi-user superposition transmission according to an embodiment of the present disclosure.

FIGS. 1A and 1B respectively illustrate the above two methods for transmitting the demodulation reference signal. FIG. 1A is a schematic diagram illustrating a first exemplary manner for transmitting a demodulation reference signal in a wireless communication system for multi-user superposition transmission according to an embodiment of the present disclosure, and FIG. 1B is a schematic diagram illustrating a second exemplary manner for transmitting a demodulation reference signal in a wireless communication system for multi-user superposition transmission according to an embodiment of the present disclosure.

Assuming that the multi-user superposition transmission is performed for user equipment 1 and user equipment 2, and the transmission data for the user equipment 1 and the user equipment 2 is TB1 (transport block 1) and TB2 (transport block 2) respectively. For the above first method, as shown in FIG. 1A, prior to a power allocation module, a demodulation reference signal DMRS1 is inserted into a modulated data stream of the user equipment 1, and a demodulation reference signal DMRS2 is inserted into a modulated data stream of the user equipment 2, such that DMRS1 and DMRS2 are superposed after subjecting to power allocation, and the superposed demodulation reference signal is transmitted to the user equipment 1 and the user equipment 2. For the above second method, as shown in FIG. 1B, a common demodulation reference signal DMRS is inserted into the superimposed data stream of the user equipment 1 and the user equipment 2, and a full power is allocated to the common demodulation reference signal DMRS to be transmitted to the user equipment 1 and the user equipment 2. It is to be noted that, in the examples illustrated in FIGS. 1A and 1B, a precoding module may be omitted, and precoded signal streams to be transmitted to the user equipment 1 and the user equipment 2 may be transmitted to the user equipment 1 and the user equipment 2 via different antennas or a same antenna.

The concept of the technology according to the present disclosure has been generally described above with reference to the schematic diagrams of FIGS. 1A and 1B. Hereinafter, the above two methods for transmitting the demodulation reference signal will be described in detail in the first embodiment and the second embodiment respectively.

First Embodiment

Firstly, a functional configuration example of an apparatus at base station side in a wireless communication system for multi-user superposition transmission according to a first embodiment of the present disclosure is described with reference to FIG. 2, which is a block diagram illustrating a functional configuration example of an apparatus at base station side in a wireless communication system for multi-user superposition transmission according to a first embodiment of the present disclosure.

Figure 2:
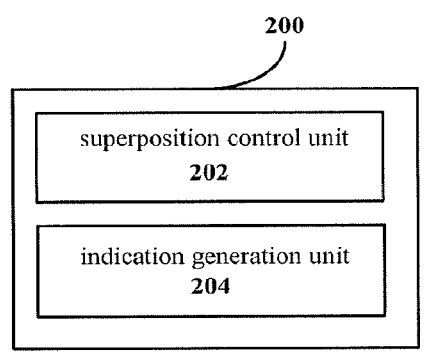
FIG. 2 is a block diagram illustrating a functional configuration example of an apparatus at base station side in a wireless communication system for multi-user superposition transmission according to a first embodiment of the present disclosure.

As shown in FIG. 2, an apparatus 200 according to this embodiment includes a superposition control unit 202 and an indication generation unit 204.

The superposition control unit 202 may be configured to insert, into a data stream of each of a group of user equipment including multiple user equipment, a demodulation reference signal corresponding to the data stream, and superpose demodulation reference signals corresponding to data streams of respective user equipment, where the superposition control unit 202 allocates a specific transmission power to the data stream of each of the multiple user equipment, so that the data streams of respective user equipment are transmitted to the multiple user equipment with same time-frequency resource, without using a multiple-input multiple-output performance gain and/or code division multiplexing. The specific transmission powers allocated to the data streams may be determined according to an existing multi-user linear superposition scheme or multi-user non-linear superposition scheme, which is not described in detail herein.

It should be understood that, in an example in which the present disclosure is applied to an LTE system, since the LTE system performs resource scheduling for data transmission in terms of a physical resource block (PRB), the above time-frequency resource may refer to a physical resource block. However, in other wireless communication system, the above time-frequency resource may also refer to a resource unit such as a same time slot on a same carrier, which will not be limited in the present disclosure.

It is to be noted that, the demodulation reference signals of the multiple user equipment for which multi-user superposition transmission is performed may be located on the same time-frequency unit such as a resource element (RE), or may be located on different time-frequency units in the same resource block, such that the demodulation reference signals of the multiple user equipment may be superposed by superposition of the same resource elements or superposition of different resource elements within the same resource block.

In the latter case in which the demodulation reference signals of the multiple user equipment are located on different time-frequency units such as the resource elements in a same resource block, although more available demodulation reference signal resources can be provided in this case, a signal (e.g., a data stream), other than the demodulation reference signal, of other user equipment may cause interference to the channel estimation based on the demodulation reference signal.

In view of the above, as a preferable example, the demodulation reference signals corresponding to the data streams of respective user equipment have different orthogonal codes, such that the demodulation reference signals corresponding to the data streams of respective user equipment are transmitted to the respective user equipment on the same resource elements or the same reference symbols. In particular, the demodulation reference signals of respective user equipment use, for example, the same reference signal sequence.

The orthogonal code herein may be, for example, an orthogonal cover code (OCC), such that interference to the demodulation reference signal caused by the data of other user equipment can be avoided by allocating different orthogonal cover codes and different transmission powers to the demodulation reference signals of respective user equipment (each user equipment transmits the demodulation reference signal on the same resource elements such that resource multiplexing between the data and the demodulation reference signal will not occur). In addition, orthogonality among the demodulation reference signals of different user equipment is ensured by using different orthogonal cover codes, thus interference between the demodulation reference signals can be avoided, thereby achieving more accurate channel estimation and demodulation.

Preferably, the superposition control unit 202 may be further configured to allocate a specific transmission power to the demodulation reference signal corresponding to the data stream of each of the multiple user equipment, and superpose the demodulation reference signals corresponding to the data streams of respective user equipment according to the allocated transmission powers.

As a preferred example, the demodulation reference signals corresponding to the data streams of respective user equipment are superposed in a manner different from a manner in which the data streams of respective user equipment are superposed. For example, the data streams may be superposed in a non-linear manner, and the corresponding demodulation reference signals may be superposed in a linear manner, such that the demodulation reference signal can have a higher design flexibility, and the receiver can implement simpler processing when performing channel estimation. Alternatively, however, the demodulation reference signals corresponding to the data streams of respective user equipment may be superposed in the same manner as the data streams of respective user equipment, that is, when the data streams are superposed in a non-linear manner, the corresponding demodulation reference signals may also be superposed in a non-linear manner.

Specifically, in a case where the demodulation reference signals are superposed in a linear manner, the linear superposition is performed by allocating different powers to the demodulation reference signals corresponding to the bit streams of different user equipment (for example, a greater transmission power is allocated to the user equipment farther from the base station, and a smaller transmission power is allocated to the user equipment closer to the base station/having a better channel condition). Specifically, for the user equipment 1, it is assumed that the demodulation reference signal thereof is $s_1$ and the power allocation coefficient thereof is $\alpha_1$; and for the user equipment 2, it is assumed that the demodulation reference signal thereof is $s_2$ and the power allocation coefficient thereof is $\alpha_2$. The demodulation reference signals $s_1$ and $s_2$ are linearly superposed by weighting using the power allocation coefficients $\alpha_1$ and $\alpha_2$, thereby obtaining a linearly superposed demodulation reference signal $S=\sqrt{\alpha_1}s_1+\sqrt{\alpha_2}s_2$.

Figure 3A:
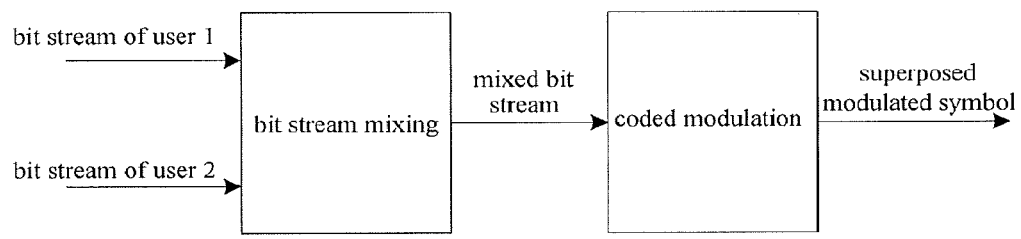
FIG. 3A is a schematic diagram illustrating an example of transmitting a demodulation reference signal in a case of a nonlinear superposition manner according to an embodiment of the present disclosure.
Figure 3B:
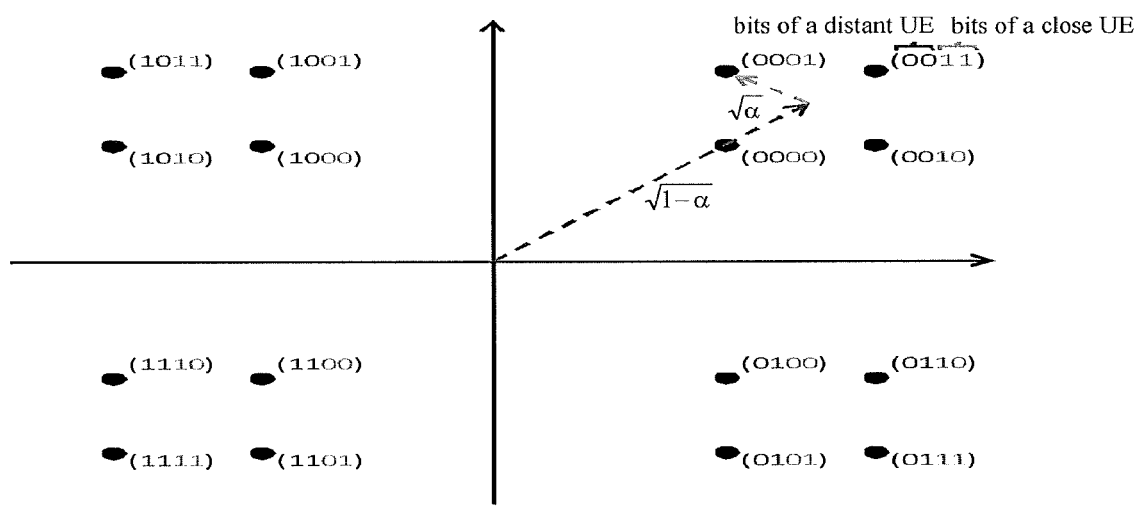
FIG. 3B is a schematic diagram illustrating an example of a Gray constellation diagram in the case of the nonlinear superposition manner according to an embodiment of the present disclosure.

In a case where the data streams are superposed in a non-linear manner, as shown in FIG. 3A, different from the linear superposition manner, the bit streams of different users are mixed into one bit stream, which is coded modulated based on a Gray constellation diagram (as shown in FIG. 3B), in which different bits correspond to the bit streams of different users. For example, in the example shown in FIG. 3B, the first two bits may represent a bit stream corresponding to distant user equipment, and the latter two bits may represent a bit stream corresponding to close user equipment. The manner shown in FIG. 3B is merely an example of course, and those skilled in the art may specify a bit stream of a user to be represented by a corresponding bit according to actual needs.

The linear superposition manner has a superior interference cancellation effect, while the non-linear superposition manner can simplify the design of the receiver. Therefore, an appropriate superposition manner can be selected by those skilled in the art according to actual needs, which will not be limited in the present disclosure.

Preferably, in this embodiment, as described with reference to FIG. 1A, since the demodulation reference signal of each user equipment is inserted into the data stream of the user equipment before the power allocation, the transmission power allocated to the demodulation reference signal of the user equipment is the same as the transmission power allocated to the data stream of the user equipment.

The indication generation unit 204 may be configured to generate, for at least a first user equipment among the multiple user equipment, an indication regarding a demodulation reference signal corresponding to a data stream of other user equipment among the multiple user equipment, to assist the first user equipment in demodulating data transmitted in the multi-user superposition transmission.

It is to be noted that, for the user equipment farthest from the base station, since the transmission power allocated thereto is the greatest, the user equipment can demodulate the data stream thereof only based on its own demodulation reference signal, without knowing the demodulation reference signal regarding other user equipment, for which the multi-user superposition transmission is performed. Therefore, such user equipment can also be implemented by a conventional user equipment. However, for the user equipment closer to the base station, if the user equipment needs to know, in addition to its own demodulation reference signal, information on the demodulation reference signal of other user equipment which are farther from the base station, the user equipment may deduce its own data stream by firstly demodulating data streams of other distant user equipment and eliminating them as linear interference, without information on specific power allocation, even in a case that different pre-coding or transmission schemes are used for user equipment for which the multi-user superposition transmission is performed. That is, in the multi-user superposition transmission, regarding the demodulation reference signals of respective user equipment, at least information on the demodulation reference signal of the user equipment farther from the base station should be notified to the user equipment closer to the base station.

The above "first user equipment" is, for example, user equipment which is closer to the base station. That is, instead of notifying to the first user equipment only its own demodulation reference signal and the corresponding power allocation coefficient in the conventional technology, in the technology of the present disclosure, the indication generation unit 204 may generate, for the first user equipment, an indication regarding the demodulation reference signal of the first user equipment itself and the demodulation reference signal of other user equipment, to inform the first user equipment of the demodulation reference signal of the first user equipment and the demodulation reference signal of the other user equipment, in order to assist the first user equipment to demodulate data transmitted in multi-user superposition transmission. It should be understood that, as compared with a power allocation coefficient which changes dynamically and has a finer quantization granularity, the demodulation reference signal allocated to each user equipment is relatively fixed, and the user equipment can estimate the power allocation coefficient based on a channel estimation result acquired according to the demodulation reference signal of the other user equipment, thus the signaling overhead can be significantly reduced.

There are two manners of determining a configuration and a group index of a demodulation reference signal group for the group of user equipment for which the multi-user superposition transmission is to be performed, and an agreement regarding the manner to be used is generally required to be reached between the base station side and the user equipment side in advance.

The first manner is a static manner, in which the configuration and the group index of the demodulation reference signal group are predefined in the communication protocol, such that fixed information regarding the configuration and the group index of the demodulation reference signal group are stored in chips on both the side of the base station and the side of the user equipment, and the base station only needs to notify the user equipment of the index of the determined demodulation reference signal group. Specifically, the superposition control unit 202 may determine a reference signal group for the group of user equipment from multiple reference signal groups each including multiple demodulation reference signals. The number of demodulation reference signals included in the determined reference signal group is greater than or equal to the number of user equipment included in the group of user equipment, and the above described indication further includes the index of the determined reference signal group.

The second manner is a semi-static manner, in which the reference signal group for each group of user equipment is semi-statically determined on the side of the base station, and is informed to the user equipment by broadcasting or RRC signaling when the reference signal group changes.

This indication may be included in physical layer signaling, which may be, for example, downlink control information (DCI) transmitted over a physical downlink control channel (PDCCH) in an LTE system, and may specifically be scheduling assignment signaling in the DCI, thus the indication is notified to the user equipment along with the transmission resource scheduling information, thereby achieving a high degree of flexibility in configuration and notification of the demodulation reference signal. Alternatively, the indication may also be included in high-level signaling (e.g., radio resource control (RRC) signaling), or may also be included in media access control (MAC) layer signaling, which is not limited in the present disclosure.

Preferably, the above indication may further include information on a demodulation reference signal for the first user equipment in the determined reference signal group. The information may be a serial number of the demodulation reference signal for the first user equipment in the reference signal group, or may also be orthogonal cover code (OCC) information, such that the first user equipment can acquire the demodulation reference signals for user equipment other than the first user equipment based on the received group index of the reference signal group in conjunction with its own demodulation reference signal.

In addition, preferably, the above indication may further include at least one bit for indicating to the user equipment an indication manner regarding the demodulation reference signal. The indication manner may include a demodulation reference signal group indication manner and a conventional demodulation reference signal indication manner.

The conventional demodulation reference signal indication manner means that the base station indicates to user equipment only the demodulation reference signal of the user equipment itself. For example, the base station may add the above conventional user equipment, which for example is user equipment farthest from the base station in a multi-user superposition transmission group and thus uses the maximum transmission power, into the group, then the conventional user equipment performs demodulation according to only its own demodulation reference signal, without parsing data stream of other user equipment. Preferably, the indication generation unit 204 may be further configured to use the conventional demodulation reference signal indication manner for at least second user equipment (e.g., a conventional user equipment farthest from the base station) in the group of user equipments. The implementation of the demodulation reference signal group indication manner will be described later in detail. In a preferred example, the base station uses the DMRS group indication manner for only the close user equipment to reduce system complexity.

It should be understood that, depending on the indication manner of the demodulation reference signal notified by the base station, the user equipment using the conventional demodulation reference signal indication manner may directly demodulate its own data without performing other processing. In other words, such user equipment does not need to know that the multi-user superposition transmission is being performed thereon, and only needs to demodulate the data in the conventional manner. On the other hand, the user equipment using the demodulation reference signal group indication manner needs to demodulate data transmitted in the multi-user superposition transmission in a manner described later, in which data of user equipment having the greatest transmission power is demodulated first, then data of the user equipment itself is demodulated in a non-linear interference cancellation manner, or data modulation may be also implemented by restoring a constellation diagram. Preferably, a demodulation reference signal which supports only a single-layer data stream may be selected for the user equipment to which the demodulation reference signal group indication manner is to be applied.

Hereinafter, an example of the demodulation reference signal group indication manner is described in detail with reference to FIGS. 4A and 4B.

Before describing the demodulation reference signal group indication manner in detail, a design principle of a demodulation reference signal group set and the demodulation reference signal group is briefly described. A demodulation reference signal group includes multiple demodulation reference signals, a position of the demodulation reference signal corresponding to each user equipment in the demodulation reference signal group is referred to as a user layer. The design principle of the demodulation reference signal group set including multiple demodulation reference signal groups is a layer-by-layer design, i.e., firstly, all possible demodulation reference signals are found and used as demodulation reference signals of the first user layer, and then, based on the demodulation reference signals of the first user layer, demodulation reference signals orthogonal to the demodulation reference signals of the first user layer are found and used as demodulation reference signals of the second user layer, thereby forming a demodulation reference signal group which have two layers. Demodulation reference signals orthogonal to the determined demodulation reference signals are superimposed layer by layer in a manner similar to the above to form a demodulation reference signal group having more than two layers.

In an example to be described below, preferably, the above indication can be divided into multiple portions, in which one portion (for example, an indication regarding the layer where the user equipment is located) can be transmitted with high-level signaling, and another portion (for example, an indication regarding the demodulation reference signal group, an indication regarding a scrambling code, and the like) may be transmitted with physical layer signaling.

Figure 4A:
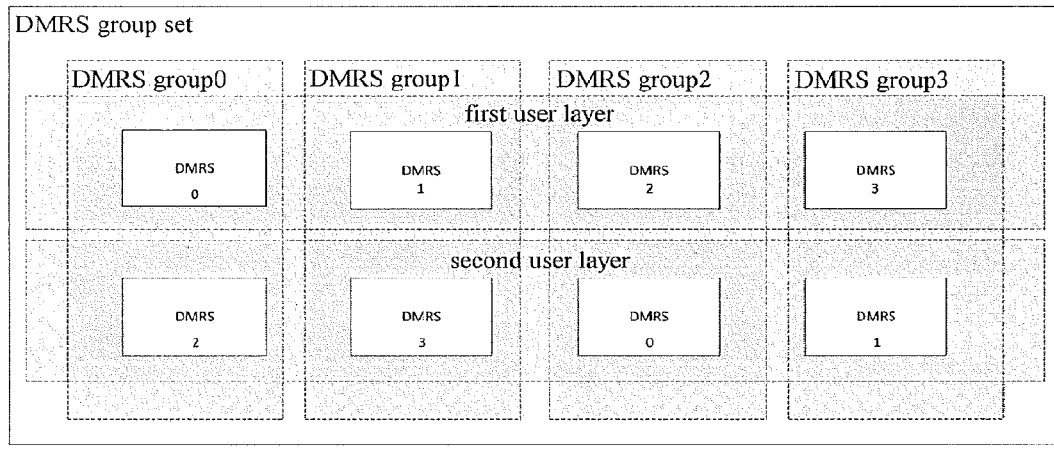
FIG. 4A is a schematic diagram illustrating a first example of a demodulation reference signal group indication manner according to an embodiment of the present disclosure.

Reference is made to FIG. 4A, which illustrates a first example of the demodulation reference signal group indication manner according to an embodiment of the present disclosure. In the example shown in FIG. 4A, a demodulation reference signal group set including four demodulation reference signal groups DMRS group 0 to DMRS group 3 is shown. The demodulation reference signal group set includes two user layers. The meanings of DMRS0 to DMRS3 are shown in the following Table 1.

TABLE 1

| DMRS value | Message |
| --- | --- |
| 0 | OCC ID = 0, $n_{SCID}$ = 0 |
| 1 | OCC ID = 0, $n_{SCID}$ = 1 |
| 2 | OCC ID = 1, $n_{SCID}$ = 0 |
| 3 | OCC ID = 1, $n_{SCID}$ = 1 | where OCC_ID represents an ID of an orthogonal code applied to each demodulation reference signal, which ensures that demodulation reference signals of different user equipment in one demodulation reference signal group are orthogonal to each other in a code division manner. It is to be noted that in this example, OCC_ID includes only two values 0 and 1 (for example, in a case that ID=0, the OCC code is 11; and in a case that ID=1, the OCC code is 10). However, with the development of technology, a group of user equipment for which the multi-user superimposition transmission is to be performed may include three or more user equipment, which indicates that the number of layers of the demodulation reference signal group may be three or more, and the OCC_ID may include more values, as long as it is ensured that the demodulation reference signals in the demodulation reference signal group to which these OCCs are applied are orthogonal to each other. $n_{SCID}$ represents the value of the scrambling code, which is generally a pseudo-random sequence and can be used to assist in distinguishing demodulation reference signals of different user equipments. In the example shown in FIG. 4A, there are four DMRS groups, and the demodulation reference signal may be indicated to the user equipment using information of two consecutive bits, which can be transmitted, for example, with physical layer signaling transmitted via the PDCCH.

According to the values of OCC_ID and $n_{SCID}$ provided in the above table, the user equipment may determine the DMRS involved in the multi-user superposition transmission group according to the group index included in, for example, the physical layer signaling (e.g., DCI) transmitted via the PDCCH, and may also determine the user layer at which the user equipment itself is located according to, for example, high layer signaling (e.g., RRC signaling), so that the user equipment can determine its own DMRS and the DMRS of other user equipment in the same group. For example, in a fixed manner, distant user equipment is at the first layer, and close user equipment is at the second layer. Since a distance between the user equipment and the base station is relatively stable, the layer at which the user equipment is located may be notified to the user equipment with high-layer signaling, thereby reducing signaling overhead. In an existing LTE system, adjacent antenna ports may occupy the same resource elements to transmit DMRSs and use orthogonal OCC codes to eliminate interference. It should be understood that an antenna port number may be used instead of the above OCC_ID to indicate information on DMRS to the user equipment.

Figure 4B:
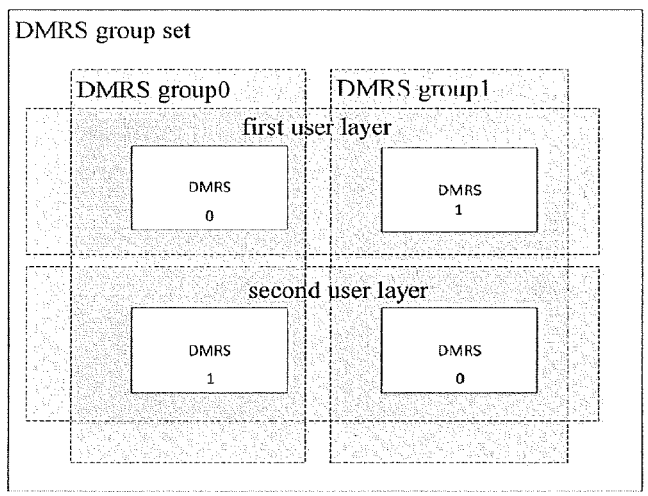
FIG. 4B is a schematic diagram illustrating a second example of the demodulation reference signal group indication manner according to an embodiment of the present disclosure.

FIG. 4B is a schematic diagram illustrating a second example of the demodulation reference signal group indication manner according to an embodiment of the present disclosure. This example differs from the example shown in FIG. 4A in that, the DMRS group set and respective DMRS groups may alternatively be the following form, i.e., DMRSs are grouped in an orthogonal manner of OCCs.

In the example shown in FIG. 4B, a demodulation reference signal group set including two demodulation reference signal groups DMRS group 0 and DMRS group 1 is shown. The demodulation reference signal group set includes two user layers. Meanings of DMRS0 and DMRS1 and values of corresponding scrambling codes are shown in the following Tables 2 and 3.

TABLE 2

| DMRS value | Message |
|---|---|
| 0 | OCC ID = 0 |
| 1 | OCC ID = 1 |

TABLE 3

| Scrambling code value | Message |
|---|---|
| 0 | $n_{SCID} = 0$ |
| 1 | $n_{SCID} = 0$ |

As shown in FIG. 4B, the OCC_ID of the user equipment at the first user layer in the DMRS group 0 is 0, the OCC_ID of the user equipment at the second user layer in the DMRS group 0 is 1, the OCC_ID of the user equipment at the first user layer in the DMRS group 1 is 1, and the OCC_ID of the user equipment at the second user layer in the DMRS group 1 is 0. With this, the user equipment acquires its own OCC ID and the OCC ID of other user equipment in the same group based on the index of the DMRS group, and the indication of user layer notified with high level signaling. In addition, since user equipment in the same multi-user superposition transmission group can use the same scrambling code, the base station can use another one-bit information to transmit an identification regarding the scrambling code ($n_{SCID}$) to the user equipment, then the user equipment can specifically determine its own DMRS and DMRS of other user equipment in the same group. That is, in the example shown in FIG. 4B, the demodulation reference signal can be indicated to the user equipment using information of two independent bits. The two-bit information may be transmitted, for example, with physical layer signaling transmitted via the PDCCH.

It is to be noted that with the development of the system, a pairing type in the user equipment group for which the multi-user superposition transmission is performed can be extended from pairing of two user equipment each having a single layer of data stream to, for example, pairing of distant user equipment having a single layer of data stream and close user equipment having multiple layers of data stream, or even more types of pairing. Therefore, there may be multiple demodulation reference signal group sets. For example, a group set 1 may include only 4 demodulation reference signal groups each having a single layer, and a group set 2 may include multiple demodulation reference signal groups, some of which have a single layer, while the others have multiple layers. An index of the demodulation reference signal group set may also be notified to the user equipment using the above indication.

As can be seen, the signaling overhead for notifying the demodulation reference signal to a group of user equipment for which the multi-user superposition transmission is performed can be reduced with the demodulation reference signal group indication manner described above. In addition, it is to be noted that the above indication manners of the demodulation reference signal are merely examples, and those skilled in the art may also appropriately modify the above manners in accordance with the principles of the present disclosure.

Figure 5A:
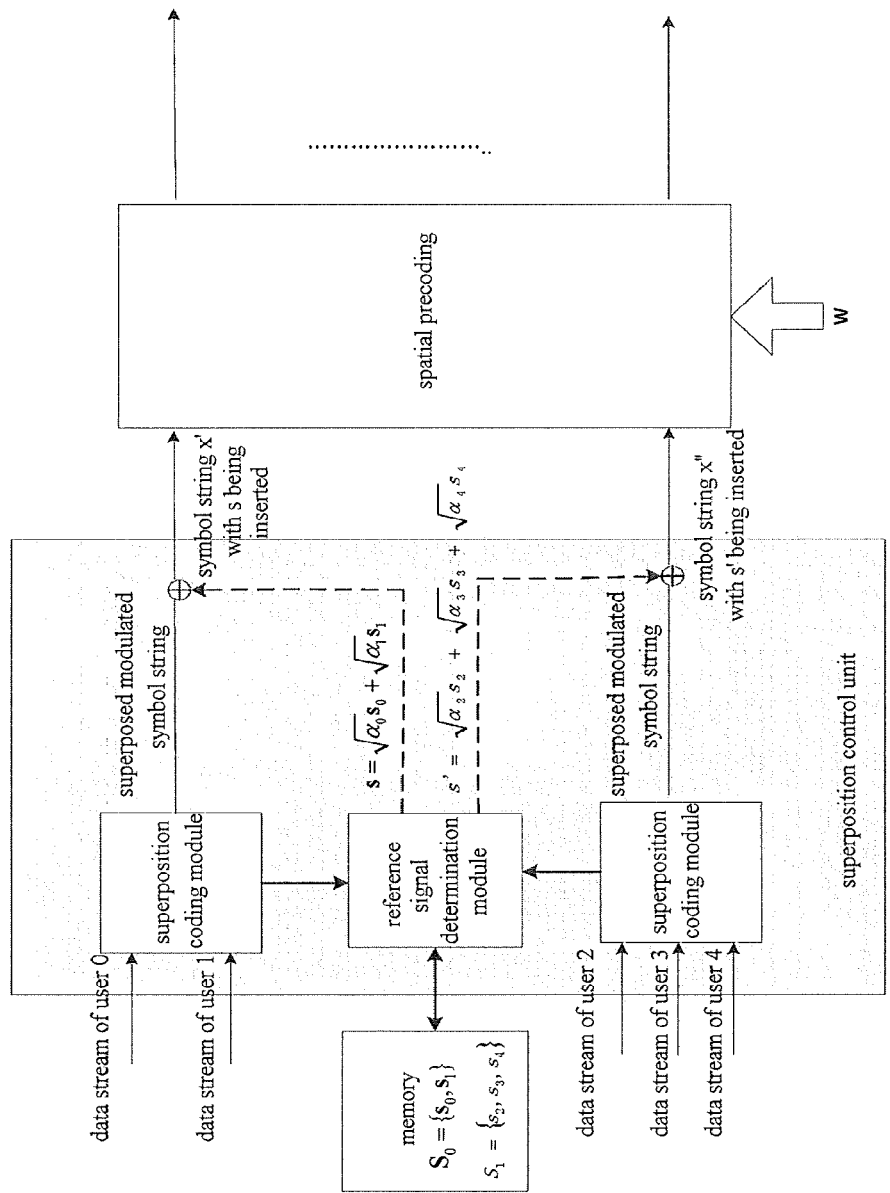
FIG. 5A is a schematic diagram illustrating an example of demodulation reference signal transmission in a wireless communication system for multi-user superposition transmission to which the technology of the present disclosure is applied, in a case that there are multiple groups of user equipment for which the multi-user superposition transmission is to be performed and each user equipment has a single layer of data stream.

In addition, it is to be noted that for the same group of user equipment, the data stream transmission for the group of user equipment can be performed without utilizing spatial division gain or diversity gain in the multiple-input multiple-output (MIMO) system and with utilizing for example code division gain in Code Division Multiple Access (CDMA). In other words, the data transmission for the group of user equipment may be performed using the same spatial precoding vector, the same transmission diversity or the same orthogonal code. However, for multiple groups of user equipment for which the multi-user superposition transmission is performed, the spatial division or diversity gain in the MIMO system may also be used in a case that one of the groups of user equipment share a MIMO channel with the other groups of user equipment. For example, an example in this case is shown in FIG. 5A. FIG. 5A is a schematic diagram illustrating an example of demodulation reference signal transmission in a wireless communication system for multi-user superposition transmission to which the technology of the present disclosure is applied, in a case that there are multiple groups of user equipment for which multi-user superposition transmission is to be performed and each user equipment has a single layer of data stream.

As shown in FIG. 5A, in this example, there are two groups of user equipment for which the multi-user superposition transmission is to be performed, that is, multi-user superimposition transmission is performed for user 0 and user 1, and multi-user superposition transmission is performed for user 2, user 3 and user 4. It is to be noted that, in FIG. 5A, for convenience of description, the superimposition control unit is divided to include a superposition coding module and a reference signal determination module, in order to further clarify functional division. However, it should be understood that in the actual implementation, such functional division may not be performed. Instead, the superposition control unit may be implemented by a single unit (e.g., a central processing unit (CPU), a digital signal processor (DSP), an application specific integrated circuit (ASIC) or the like) to perform corresponding functions.

Specifically, the base station allocates a first power to the data stream of the user 0 to acquire a first power signal, and allocates a second power to the data stream of the user 1 to acquire a second power signal, and the superimposition coding module superposes the first power signal and the second power signal into a modulated symbol string. Similarly, the base station allocates a third power to the data stream of the user 2 to acquire a third power signal, allocates a fourth power to the data stream of the user 3 to acquire a fourth power signal, and allocates a fifth power to the data stream of the user 4 to acquire a fifth power signal, and the superimposition coding module superposes the third power signal, the fourth power signal and the fifth power signal into a modulated symbol string. Then, the reference signal determination module determines, from multiple reference signal groups stored in advance in the memory, reference signal groups for a first user group including the user 0 and the user 1 and a second user group including the user 2 to the user 4, respectively. Here, it is assumed that the reference signal group $S_0$ is determined for the first user group, and the reference signal group $S_1$ is determined for the second user group. Then, the superposition coding module may superpose, for example, in the linear superimposition manner, the reference signals in each reference signal group according to the transmission powers allocated to respective user equipment, and then insert the superimposed reference signal into the superposed modulated symbol string, thereby respectively acquiring a symbol string x' for the first user group and a symbol string x" for the second user group. Then, spatial precoding is applied to the symbol string x' for the first user group and the symbol string x" of the second user group.

It should be noted that the spatial precoding module in FIG. 5A is optional. In a case that the spatial precoding is applied, the data streams of the user 0 and the user 1 (which have been combined into x') use the same spatial precoding vector, and the data streams of the user 2, the user 3 and the user 4 (which have been combined into x") use the same spatial precoding vector, whereas in the existing multi-user multiple-input multiple-output (MU-MIMO) system, all users use different spatial precoding vectors. In addition, the advantage of applying spatial precoding here is that the time-frequency resources can be further shared in a unit of user group while eliminating inter-group interference, that is, on the basis of multi-user superposition transmission, the spatial division gain in the MIMO system is further utilized, such that the first user group (users 0 and 1) and the second user group (users 2, 3, and 4) share time-frequency resources to perform transmission, thereby significantly enhancing resource utilization efficiency by means of the MUST+MU-MIMO two-level resource sharing mechanism.

In addition, it is to be noted that, in the example shown in FIG. 5A, for convenience of description, it is shown that the superposed demodulation reference signal is inserted into the superposed data stream. However, in the actual transmission, demodulation reference signals of respective user equipment are respectively inserted into the corresponding data stream to be superposed by the superposition coding module.

The user equipment may include a single layer of data stream (one channel of data stream) or a multiple layers of data streams (multiple channels of data streams) when performing data transmission with the base station. For example, for user equipment closer to the base station, the user equipment may have multiple layers of data streams in a case of good channel condition, and for user equipment distant from the base station, the user equipment typically has only a single layer of data stream. When multi-user superposition transmission is performed for user equipment having multiple layers of data streams and user equipment having a single layer of data stream, one of the multiple layers of data streams is selected and superposed with the single layer of data stream of the other user equipment, to perform multi-user superposition transmission, or spatial precoding is performed on the multiple layers of data streams to acquire a single channel of transmission stream to be superposed with the data stream of the other user equipment. Preferably, all user equipment have only a single layer of data stream, which can reduce system complexity and is easy to be implemented. Hereinafter, these three cases will be described with reference to FIGS. 5A to 5C, that is, the case where all the user equipment have only a single layer of data stream, the case where spatial precoding is performed on the multiple layers of data streams to acquire a single channel of transmission stream to be superposed, and the case where only one of the multiple layers of data streams is selected and superposed with the data stream of the other user equipment to perform multi-user superposition transmission, while the remaining layers of data streams are transmitted in the conventional manner.

As shown in FIG. 5A, in this example, each user equipment has only a single layer of data stream, and multi-user superposition transmission is performed for user equipment in each group of user equipment in the manner described above. The specific superposition manner can be referred to the corresponding description above, and is not repeated herein.

Figure 5B:
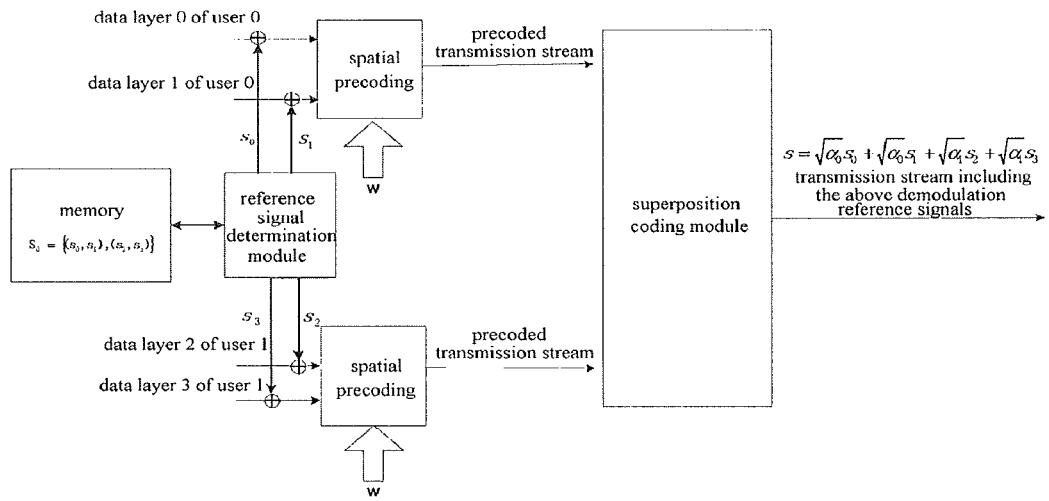
FIG. 5B is a schematic diagram illustrating a first example of demodulation reference signal transmission in a wireless communication system for multi-user superposition transmission to which the technology of the present disclosure is applied, in a case that the user equipment has multiple layers of data streams.

FIG. 5B is a schematic diagram illustrating a first example of demodulation reference signal transmission in a wireless communication system for multi-user superposition transmission to which the technology of the present disclosure is applied, in a case that the user equipment has multiple layers of data streams.

As shown in FIG. 5B, in this example, each of user 0 and user 1 includes two layers of data streams, demodulation reference signals $s_0$ and $s_1$ may be respectively allocated to the two layers of data streams of the user 0, and demodulation reference signals $s_2$ and $s_3$ may be respectively allocated to the two layers of data streams of the user 1. In contrast to the example shown in FIG. 5A, before the demodulation reference signals of the user 0 and the user 1 are superimposed and coded, spatial precoding is performed on the two layers of data streams of each of the user 0 and the user 1 to acquire a single channel of transmission stream (at this time, the pre-coded demodulation reference signal of the user 0 is $s_0+s_1$, and the pre-coded demodulation reference signal of the user 1 is $s_2+s_3$). Then, the pre-coded single channel of transmission streams of the user 0 and the user 1 are superposed by the superposition coding module in a manner similar to that used in the case of the single layer data stream shown in FIG. 5A, thereby acquiring the superimposed demodulated reference signal s.

Figure 5C:
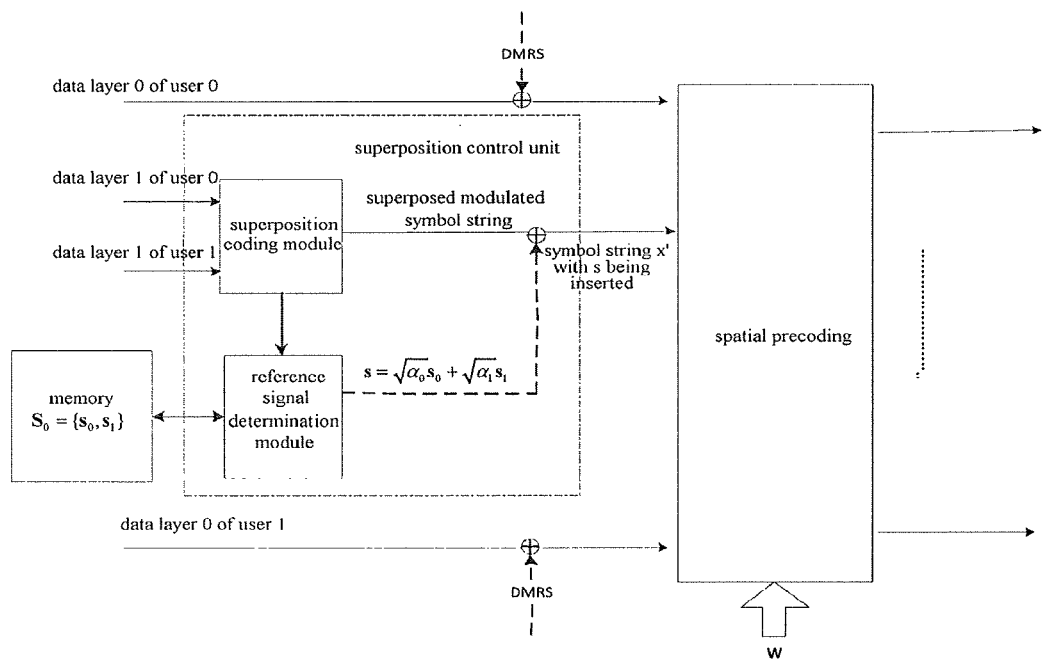
FIG. 5C is a schematic diagram illustrating a second example of demodulation reference signal transmission in a wireless communication system for multi-user superposition transmission to which the technology of the present disclosure is applied, in a case that the user equipment has multiple layers of data streams.

FIG. 5C is a schematic diagram illustrating a second example of demodulation reference signal transmission in a wireless communication system for multi-user superposition transmission to which the technology of the present disclosure is applied in a case that the user equipment has multiple layers of data streams.

As shown in FIG. 5C, in this example, each of user 0 and user 1 includes two layers of data streams, and the data layer 1 of the user 0 and the data layer 1 of the user 1 are selected for multi-user superposition transmission. The superposition transmission manner is the same as above, and is not repeated here. The data layer 0 of the user 0 and the data layer 0 of the user 1 may be transmitted in the conventional manner.

Here, it is to be noted that, the superposition coding module, the reference signal determination module and the spatial precoding module in FIGS. 5B and 5C have the same functions and configurations as those of the corresponding modules described above with reference to FIG. 5A, and description thereof is not repeated here.

Preferably, each of the user equipment has only a single layer of data stream, and the superposition control unit 202 inserts a demodulation reference signal which supports only a single-layer data stream into the data stream of each user equipment. In this way, the system complexity can be reduced.

In addition, preferably, as shown in FIGS. 5A to 5C, the apparatus 200 may further include a storage unit. The storage unit may be configured to store information on a demodulation reference signal group set which includes multiple demodulation reference signal groups. The multiple demodulation reference signals included in each demodulation reference signal group are orthogonal to each other in a code division manner, and the superposition control unit may read the storage unit to determine the reference signal group for each group of user equipment.

Preferably, the apparatus 200 may be an independent processing chip located on the side of the base station, and transmit the superposed demodulation reference signal acquired by the superposition control unit 202 and the indication generated by the indication generation unit 204 to at least the first user equipment though an external communication unit. Alternatively, the apparatus 200 may be the base station itself, and in this case, the apparatus 200 may further include a transmission unit, which may be configured to transmit the superposed demodulation reference signal acquired by the superposition control unit 202 and the indication generated by the indication generation unit 204 to at least the first user equipment.

Figure 6:
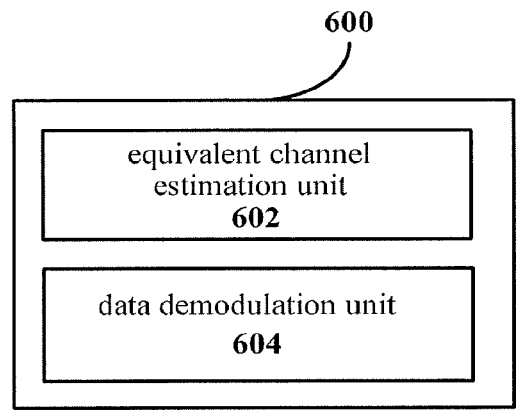
FIG. 6 is a block diagram illustrating a functional configuration example of an apparatus at user equipment side in a wireless communication system for multi-user superposition transmission according to the first embodiment of the present disclosure.

Next, a functional configuration example of an apparatus on the side of the user equipment corresponding to the apparatus on the side of the base station in the above embodiment is described with reference to FIG. 6. FIG. 6 is a block diagram showing a functional configuration example of an apparatus at user equipment side in a wireless communication system for multi-user superposition transmission according to the first embodiment of the present disclosure.

As shown in FIG. 6, an apparatus 600 according to this embodiment may include an equivalent channel estimation unit 602 and a data demodulation unit 604.

The equivalent channel estimation unit 602 may be configured to estimate, based on a superposed demodulation reference signal regarding a target user equipment and other equipments and an indication regarding a demodulation reference signal of the other user equipment from a base station, an equivalent channel corresponding to a data stream of the target user equipment and an equivalent channel corresponding to a data stream of the other user equipment. A demodulation reference signal regarding the target user equipment and the demodulation reference signal regarding the other user equipment are inserted into data streams of respective user equipment, and the data streams of respective user equipment are transmitted by the base station at specific transmission powers with same time-frequency resource, without using a multiple-input multiple-output performance gain and/or code division multiplexing. The specific channel estimation process is the same as the conventional technology, and is not described herein.

Preferably, as described above, the indication may be included in physical layer signaling (e.g., DCI), high layer signaling (e.g., RRC signaling), or MAC signaling. Alternatively, a part of the indication may be included in the physical layer signaling, while another part of the indication may be included in the high layer signaling, such that the equivalent channel estimation unit 602 can acquire a corresponding demodulation reference signal indication based on these signaling.

Preferably, the demodulation reference signals regarding respective user equipment have different orthogonal codes, such that the demodulation reference signals regarding respective user equipment are transmitted to the respective user equipment on same resource elements. In addition, preferably, each user equipment has only a single layer of data stream, and a demodulation reference signal which supports only a single-layer data stream is inserted into the data stream of each user equipment. In addition, preferably, specific transmission powers are allocated to the demodulation reference signals regarding respective user equipment, and the superposed demodulation reference signal is obtained by superposition according to the allocated transmission powers, and the demodulation reference signals regarding respective user equipment are superposed in a manner which may be the same as or different from a manner in which the data streams of respective user equipment are superposed. In addition, the transmission power allocated to the demodulation reference signal regarding each user equipment is the same as the transmission power allocated to the data stream of the user equipment.

The equivalent channel estimation unit 602 may be further configured to determine an index of a reference signal group for a group of user equipment including the target user equipment and the other user equipment according to the indication from the base station. The number of demodulation reference signals in the reference signal group is greater than or equal to the number of user equipment in the group of user equipment. Specifically, in the case of the above static manner, the target user equipment may acquire a corresponding demodulation reference signal from a memory thereof according to the index of the reference signal group notified by the base station, while in the case of the semi-static manner, the target user equipment may be informed of information on the demodulation reference signal group according to broadcast signaling or RRC signaling from the base station.

The equivalent channel estimation unit 602 may be further configured to determine the demodulation reference signal regarding the other user equipment according to the determined index and the information on the demodulation reference signal regarding the target user equipment included in the indication (for example, a serial number of the demodulation reference signal of the target user equipment in the reference signal group or OCC information), and the data demodulation unit 604 may demodulate data transmitted in multi-user superposition transmission according to the determined demodulation reference signals regarding the target user equipment itself and the other user equipment.

The equivalent channel estimation unit 602 may be further configured to determine an indication manner of the demodulation reference signal regarding the user equipment according to the indication. The indication manner includes a demodulation reference signal group indication manner and a conventional demodulation reference signal indication manner, and the indication manner of the demodulation reference signal of at least one user equipment (e.g., a conventional user equipment farthest from the base station) in the group of user equipment for which the multi-user superposition transmission is performed is the conventional demodulation reference signal indication manner. Preferably, a demodulation reference signal which supports only a single-layer data stream may be selected for the user equipment to which the demodulation reference signal group indication manner is to be applied.

The data demodulation unit 604 may be configured to demodulate data transmitted in multi-user superposition transmission according to the estimated equivalent channels (including the equivalent channel of the target user equipment itself and the equivalent channel of the other user equipment). The specific processing of demodulating the data stream according to the equivalent channel is the same as the conventional technology, and is not described herein.

Instead of notifying each user equipment of the power allocation coefficient thereof by the base station in the conventional technology, according to the technology of the present disclosure, the user equipment can calculate the power allocation coefficients of itself and other user equipment based on the estimated equivalent channels, and demodulate the data stream based on the calculated power allocation coefficients. This will be described in detail below with reference to FIG. 7, which is a block diagram illustrating another functional configuration example of an apparatus at user equipment side in a wireless communication system for multi-user superposition transmission according to the first embodiment of the present disclosure.

Figure 7:
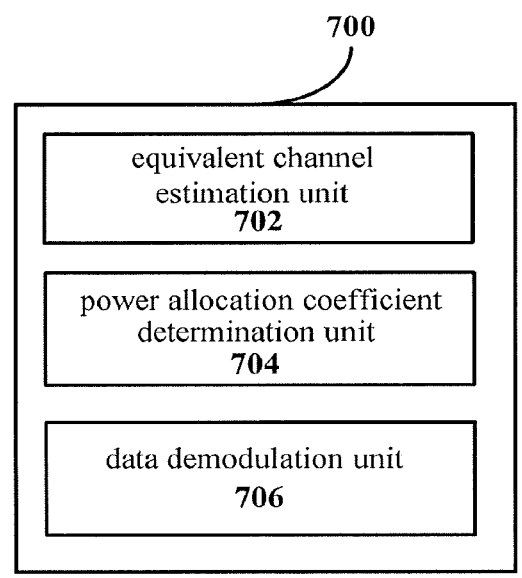
FIG. 7 is a block diagram illustrating another functional configuration example of an apparatus at user equipment side in a wireless communication system for multi-user superposition transmission according to the first embodiment of the present disclosure.

As shown in FIG. 7, an apparatus 700 according to this example may include an equivalent channel estimation unit 702, a power allocation coefficient determination unit 704, and a data demodulation unit 706. The functional configurations of the equivalent channel estimation unit 702 and the data demodulation unit 706 are substantially the same as those of the equivalent channel estimation unit 602 and the data demodulation unit 604 described above with reference to FIG. 6, and the description thereof is not repeated here. An example of the functional configuration of the power allocation coefficient determination unit 704 is described in detail below.

The power allocation coefficient determination unit 704 may be configured to determine power allocation coefficients of the target user equipment and the other user equipment according to the equivalent channels estimated by the equivalent channel estimation unit 702.

Specifically, it is assumed that the base station selects user 0 and user 1 to perform multi-user superposition transmission therefor, and the demodulation reference signals for the user 0 and the user 1 are $s_0$ and $s_1$, respectively. After the equivalent channel estimation unit 702 estimates, based on the received superposed demodulation reference signal and the indication regarding the demodulation reference signals $s_0$ and $s_1$, the equivalent channel $h_0$ corresponding to the data stream of the user 0 and the equivalent channel $h_1$ corresponding to the data stream of the user 1, the power allocation coefficient determination unit 704 may derive a common channel h (i.e., a physical channel) experienced by the demodulation reference signals $s_0$ and $s_1$ and the power allocation coefficients $\alpha_0$ and $\alpha_1$ for the user 0 and the user 1 according to the equivalent channels $h_0$ and $h_1$, for example, by specifically solving the following system of equations (1).

$$h\alpha_0 P = h_0,$$

$$h\alpha_1 P = h_1,$$

$$\alpha_0 + \alpha_1 = 1 \quad (1)$$

where P is the total transmission power of the base station and can be notified to the user equipment by the base station, for example, using the above indication. Alternatively, the base station may not notify the total transmission power to the user equipment, and the user equipment can acquire the power allocation coefficients of respective user equipment by solving the following equations.

$$\frac{\alpha_0}{\alpha_1} = \frac{h_0}{h_1}, \quad (2)$$

$$\alpha_0 + \alpha_1 = 1$$

Further, the data demodulation unit 706 may be further configured to demodulate data transmitted in multi-user superposition transmission based on the determined power allocation coefficients.

Specifically, as an exemplary manner, the data demodulation unit 706 may be configured to restore a constellation diagram based on the determined power allocation coefficients, to demodulate the data transmitted in multi-user superposition transmission. It should be noted that this data demodulation manner generally applies to the case where the data streams are superimposed in a non-linear manner.

Alternatively, as another exemplary manner, after the power allocation coefficients are determined, a demodulation order of the data streams can be determined, i.e., generally, the data demodulation unit 706 may first demodulate the data stream of the user equipment having the maximum power allocation coefficient. If the demodulated data stream is not the data stream of the target user equipment, the data stream of other user equipment may be processed as interferences, which may be eliminated in a non-linear interference cancellation manner, and then the data stream of the target user equipment is demodulated based on the equivalent channel of the target user equipment. It is to be noted that this data demodulation manner generally applies to the case where the data streams are superimposed in a linear manner.

It is to be noted that the power allocation coefficient determination unit here is optional. The determined power allocation coefficient can be used for subsequent operations such as retransmission. That is, in the case where only the data demodulation operation is required, data demodulation can be implemented without determining the power allocation coefficients of respective user equipment.

Instead of determining the power allocation coefficients of respective user equipment in the above example, the demodulation order of data streams of respective user equipment can be determined without determining the power allocation coefficients. In the following, this case is described in detail with reference to FIG. 8, which is a block diagram illustrating another functional configuration example of an apparatus at user equipment side in a wireless communication system for multi-user superposition transmission according to the first embodiment of the present disclosure.

Figure 8:
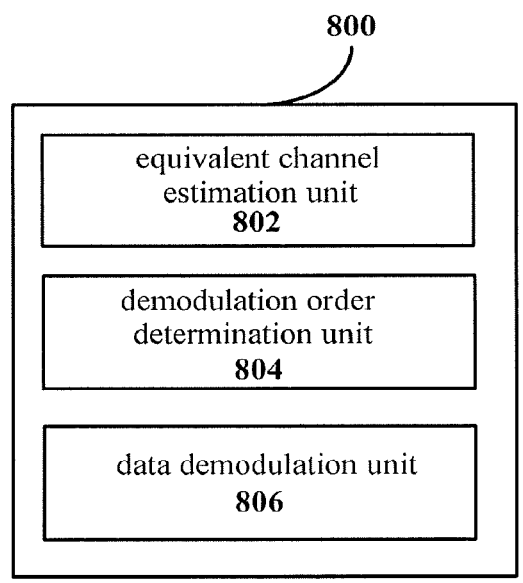
FIG. 8 is a block diagram illustrating yet another functional configuration example of an apparatus at user equipment side in a wireless communication system for multi-user superposition transmission according to the first embodiment of the present disclosure.

As shown in FIG. 8, an apparatus 800 according to this example may include an equivalent channel estimation unit 802, a demodulation order determination unit 804, and a data demodulation unit 806. The functional configurations of the equivalent channel estimation unit 802 and the data demodulation unit 806 are substantially the same as those of the equivalent channel estimation unit 602 and the data demodulation unit 604 described above with reference to FIG. 6, and the details thereof are not described here. In the following, only the function configuration example of the demodulation order determination unit 804 is described in detail.

The demodulation order determination unit 804 may be configured to determine a data demodulation order of the target user equipment and the other user equipment according to the equivalent channels estimated by the equivalent channel estimation unit 802. Specifically, as an example, the greater the equivalent channel is, the earlier the data stream is demodulated. It is to be noted that, although the data demodulation order is determined directly based on the estimated equivalent channels in this example, the data demodulation order may be also determined after the power allocation coefficients of respective user equipment are calculated, as in the example described above with reference to FIG. 7. That is, the functional modules in FIG. 7 and FIG. 8 can be combined.

In addition, the data demodulation unit 806 may be further configured to demodulate data transmitted in multi-user superposition transmission according to the determined data demodulation order. Specifically, in a case of determining that the data stream of the target user equipment is to be demodulated first, the data demodulation unit 806 may directly demodulate the data stream of the target user equipment according to the equivalent channel. However, in a case that the data stream which is to be demodulated first is not the data stream of the target user equipment, the data demodulation unit 806 may be further configured to demodulate the data stream of the target user equipment in a non-linear interference cancellation manner according to the determined data demodulation order. That is, the data stream of the target user equipment is demodulated based on the equivalent channel of the target user equipment after eliminating the data stream of the other user equipment as interference.

It should be understood that the above apparatuses 600 to 800 may be independent processing chips on the side of the user equipment, which receive the superposed demodulation reference signal and the relevant indication from the base station via an external reception unit. Alternatively, the apparatuses 600 to 800 may also be the user equipment itself, and in this case, the apparatuses 600 to 800 may further include a reception unit configured to receive the superposed demodulation reference signal and the above indication regarding the demodulation reference signal from the base station.

In addition, it is to be noted that the apparatuses 600 to 800 on the side of the user equipment described here correspond to the apparatus 200 on the side of the base station. Therefore, the contents which are not described in detail here can be referred to the corresponding description above, and are not repeated herein.

In order to facilitate understanding of the transmission manner of the demodulation reference signal according to the first embodiment of the present disclosure, a signaling interaction process between the side of the base station side and the side of the user equipment in this embodiment is systematically described with reference to the flowchart shown in FIG. 9, which is a flowchart illustrating a signaling interaction process in a wireless communication system for multi-user superposition transmission according to the first embodiment of the present disclosure.

Figure 9:
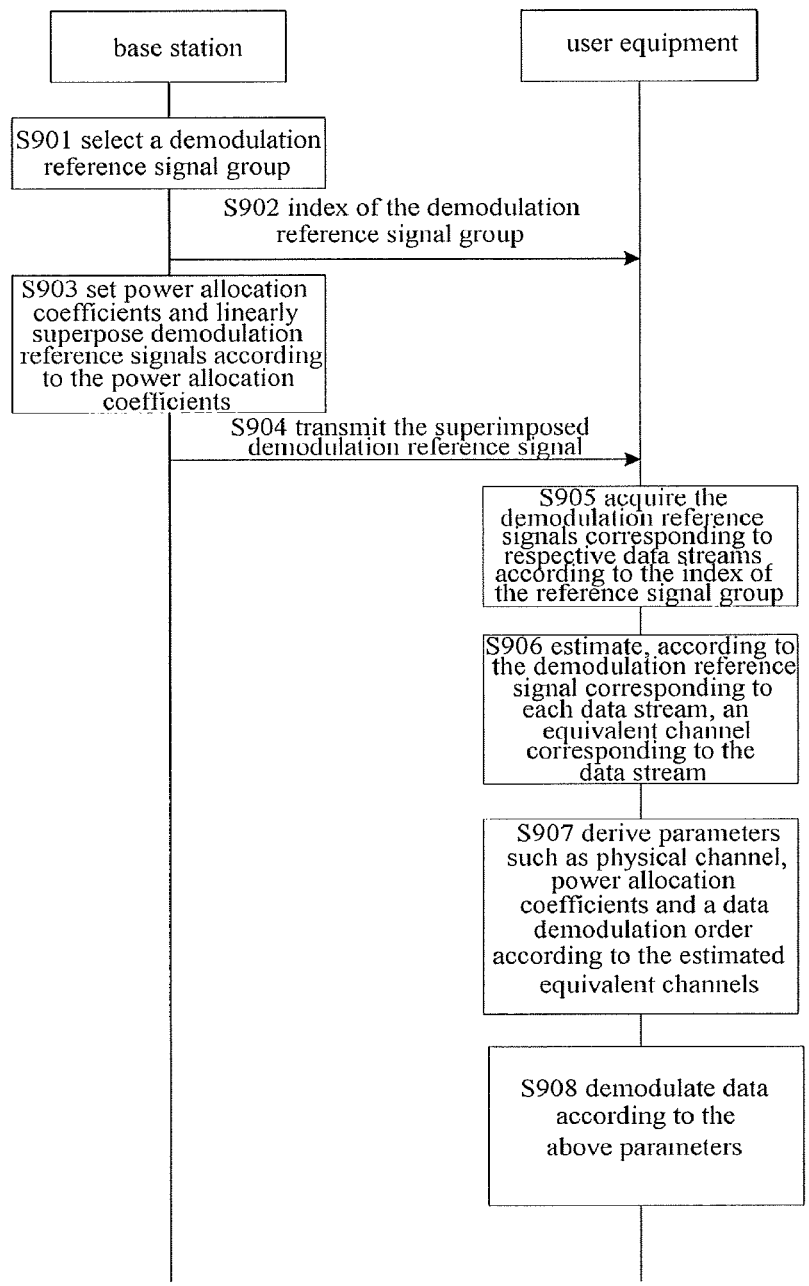
FIG. 9 is a flow chart illustrating a signaling interaction process in a wireless communication system for multi-user superposition transmission according to the first embodiment of the present disclosure.

As shown in FIG. 9, in step S901, the base station may select a corresponding demodulation reference signal group for a group of user equipment for which multi-user superposition transmission is to be performed. In step S902, the base station notifies an index of the demodulation reference signal group to the user equipment. It is to be noted that, for a fixed group of user equipment, the selected demodulated reference signal group is usually fixed, thus it generally only needs to notify the user equipment of the index once. For example, it is assumed that there are four demodulation reference signals $s_0$, $s_1$, $s_2$ and $s_3$, where $s_0$ and $s_1$ share time-frequency resources, are orthogonal to each other in a code division manner and form a demodulation reference signal group $S_0=\{s_0, s_1\}$; and $s_2$ and $s_3$ share time-frequency resources, are orthogonal to each other in a code division manner, and form a demodulation reference signal group $S_1=\{s_2, s_3\}$. The demodulation reference signals (i.e., $s_0$, $s_1$, $s_2$ and $s_3$) in $S_0$ and $S_1$ are orthogonal to each other in a time division manner or in a frequency division manner. Here, it is assumed that the base station selects the user 0 and the user 1 to perform multi-user superposition transmission therefor to transmit encoded bit streams $c_0$ and $c_1$ respectively, and that the user 0 is the target user equipment, the demodulation reference signal group $S_0$ is selected for the user 0 and the user 1, and the index of this demodulation reference signal group is notified to the user equipment. Preferably, the base station may also notify serial numbers of the demodulation reference signals corresponding to the user 0 and the user 1 in the group to the user 0 and the user 1.

Next, in step S903, the base station sets power allocation coefficients $\alpha_0$ and $\alpha_1$ for the user 0 and the user 1 respectively, where $\alpha_1=1-\alpha_0$, weights and linearly superposes $s_0$ and $s_1$ using the power allocation coefficients, thereby obtaining $s'=\sqrt{\alpha_0}s_0+\sqrt{\alpha_1}s_1$. A modulated symbol stream transmitted in multi-user superposition transmission is denoted as x, which may be a linear superposition result or a non-linear superposition result. Then, in step S904, the base station transmits the superimposed demodulation reference signal to the user equipment. Specifically, the base station inserts s' into the superposed modulated symbol stream x to obtain a symbol string x', precodes the symbol string x' and maps it onto a time-frequency resource unit in an OFDM symbol for transmission.

Then, in step S905, the user equipment acquires the demodulation reference signals corresponding to the data streams of the user 0 and the user 1 according to the index of the demodulation reference signal group. Specifically, the user equipment acquires the demodulation reference signal group used by the base station based on the index of the demodulation reference signal group, and acquires the demodulation reference signal corresponding to the data stream of itself and demodulation reference signals corresponding to other data streams according to user serial numbers. Alternatively, in the case where the base station and the user equipment reach an agreement on the configuration of the demodulation reference signal group in advance, the user equipment can determine the demodulation reference signals for respective user equipment based on only the index of the demodulation reference signal group.

Next, in step S906, the user equipment estimates, according to the demodulation reference signal corresponding to a data stream of each user equipment, an equivalent channel corresponding to each data stream. Specifically, the user 0 acquires an equivalent channel $h_0$ corresponding to the data stream of itself according to the demodulation reference signal corresponding to the data stream of itself, and acquires an equivalent channel h1 corresponding to the data stream of the user 1 according to the demodulation reference signal corresponding to the user 1.

Next, in step S907, the user equipment derives a physical channel and parameters such as power allocation coefficients of respective user equipment and a data demodulation order according to the estimated equivalent channels. Specifically, the user 0 may derive a common channel h experienced by $s_0$ and $s_1$ and the power allocation coefficients $\alpha_0$ and $\alpha_1$ according to the estimated equivalent channels $h_0$ and $h_1$, by solving, for example, the following system of equations.

$$\frac{\alpha_0}{\alpha_1} = \frac{h_0}{h_1},$$

$$\alpha_0 + \alpha_1 = 1$$

Finally, in step S908, the user equipment may preferentially demodulate the data stream having a greater power allocation coefficient according to the above determined power allocation coefficients. In a case that this data stream is not the data stream of the target user equipment, i.e., the user 0, the user 0 may eliminate the data stream $c_1$ of the user 1 as an interference from the received signal after demodulating the data stream $c_1$ according to the equivalent channel $h_1$ of the user 1. After that, the user 0 demodulates the data stream $c_0$ of itself based on the equivalent channel $h_0$. Alternatively, the user equipment may also restore a constellation diagram based on the power allocation coefficients, and demodulate the data stream corresponding the user equipment based on the constellation diagram.

It is to be noted that the signaling interaction process shown in FIG. 9 is merely an example but not limitation, and those skilled in the art may also modify the above process in accordance with the principles of the present disclosure. For example, in step S907, the user equipment may also directly perform data demodulation based on the equivalent channel estimation, without determining parameters such as the power allocation coefficients and the demodulation reference order. As another example, in the case where the base station determines the demodulation reference signal group in a semi-static manner, in step S902, not the index of the demodulation reference signal group, but current configuration of the demodulation reference signal group, is notified to the user equipment. As yet another example, the base station may also notify the user equipment of the total transmission power of the base station, such that the user equipment can calculate the power allocation coefficient of each user equipment using the above system of equations (1) based on the total transmission power and the estimated equivalent channels.

In the above, an example, in which a corresponding demodulation reference signal is inserted into a data stream of each of multiple user equipment for which multi-user superposition transmission is being performed to transmit multiple demodulation reference signals in multi-user superposition transmission according to the first embodiment of the present disclosure, has been described with reference to FIGS. 2 to 9. As can be seen, according to this embodiment, since it is not necessary for the base station side to notify power allocation coefficients which change dynamically to the user equipment, the signaling overhead can be significantly reduced. Next, a transmission manner of the demodulation reference signal according to a second embodiment of the disclosure, where a common demodulation reference signal is inserted into a superposed data stream of multiple user equipment, will be described.

Second Embodiment

Figure 10:
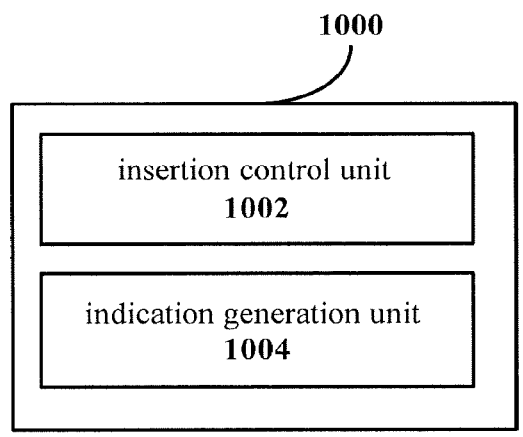
FIG. 10 is a block diagram illustrating a functional configuration example of an apparatus at base station side in a wireless communication system for multi-user superposition transmission according to a second embodiment of the present disclosure.

FIG. 10 is a block diagram illustrating a functional configuration example of an apparatus at base station side in a wireless communication system for multi-user superposition transmission according to a second embodiment of the present disclosure.

As shown in FIG. 10, an apparatus 1000 according to this example may include an insertion control unit 1002 and an indication generation unit 1004.

The insertion control unit 1002 may be configure to insert a common demodulation reference signal into a superposed data stream of multiple user equipment. This embodiment differs from the transmission manner of the demodulation reference signal in the first embodiment described above with reference to FIG. 1A in that, the common demodulation reference signal is inserted into the superposed data streams of the multiple user equipment instead of inserting a corresponding demodulation reference signal into the data stream of each of the multiple user equipment.

The indication generation unit 1004 may be configured to generate, for at least a first user equipment of the multiple user equipment, an indication regarding power allocation coefficients corresponding to data streams of the multiple user equipment, to assist the first user equipment in demodulating data transmitted in multi-user superposition transmission. Preferably, as described above, the indication may be included in physical layer signaling (e.g., DCI), high layer signaling (e.g., RRC signaling), or MAC signaling. Alternatively, a part of the indication may be included in the physical layer signaling and another part of the indication may be included in the high layer signaling.

This embodiment differs from the first embodiment in that, since only the common demodulation reference signal is transmitted to all user equipment, the corresponding power allocation coefficients are required to be notified to each of the user equipment such that the user equipment can demodulate the target data streams thereof. Therefore, this transmission manner of the demodulation reference signal has greater signaling overhead as compared with the first embodiment.

Preferably, the insertion control unit 1002 is further configured to allocate a full transmission power to the common demodulation reference signal. It should be understood that, although the notification of the power allocation coefficients increases the signaling overhead, since the common demodulation reference signal is transmitted using the full transmission power in this embodiment, the accuracy of channel estimation of the user equipment can be greatly improved, as compared with the conventional technology in which the demodulation reference signal of each of the user equipment is transmitted using only a fractional transmission power.

Similar to the above apparatus 200 on the side of the base station, the apparatus 1000 may be an independent processing chip located on the side of the base station, and transmit the common demodulation reference signal and the indication regarding power allocation coefficients of respective user equipment, which are determined by the apparatus 1000, to the user equipment though an external communication unit. Alternatively, the apparatus 1000 may be the base station itself, and in this case, the apparatus 1000 may further include a transmission unit, which may be configured to transmit the above common demodulation reference signal and the above indication to at least the first user equipment.

Corresponding to the apparatus 1000, a function configuration example of an apparatus at user equipment side is described below.

Figure 11:
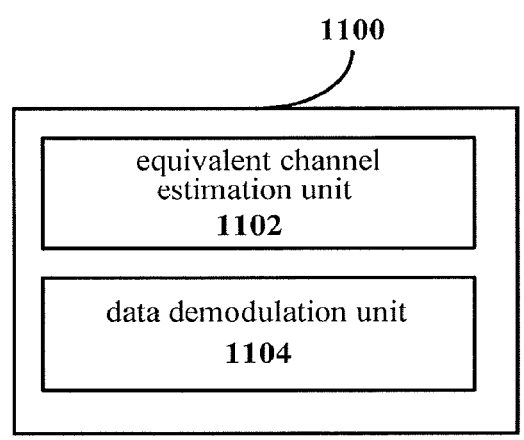
FIG. 11 is a block diagram illustrating a functional configuration example of an apparatus at user equipment side in a wireless communication system for multi-user superposition transmission according to the second embodiment of the present disclosure.

FIG. 11 is a block diagram illustrating a functional configuration example of an apparatus at user equipment side in a wireless communication system for multi-user superposition transmission according to the second embodiment of the present disclosure.

As shown in FIG. 11, an apparatus 1100 according to this example may include an equivalent channel estimation unit 1102 and a data demodulation unit 1104.

The equivalent channel estimation unit 1102 may be configured to estimate, according to a common demodulation reference signal from a base station, an equivalent channel corresponding to a superposed data stream from the base station, where the common demodulation reference signal is inserted into the superposed data stream. As described above, since the common demodulation reference signal is transmitted with a full transmission power, the user equipment can estimate the equivalent channel corresponding to a full power signal, i.e., corresponding to the superposed data stream, according to the received common demodulation reference signal.

The data demodulation unit 1104 may be configured to demodulate data transmitted in multi-user superposition transmission according to the estimated equivalent channel and an indication regarding power allocation coefficients of the target user equipment and other user equipment from the base station. Specifically, the data demodulation unit 1104 may be further configured to determine, according to the estimated equivalent channel and the indication regarding power allocation coefficients, an equivalent channel corresponding to a data stream of the target user equipment and an equivalent channels corresponding to data stream of the other user equipment, and demodulate data transmitted in multi-user superposition transmission according to the determined equivalent channels of respective user equipment. The specific processing of demodulating data according to the equivalent channel is the same as the conventional technology, and is not described herein.

As an example, the data demodulation unit 1104 may be further configured to demodulate the data transmitted in multi-user superposition transmission in a non-linear interference cancellation manner by preferentially demodulating a data stream corresponding to user equipment with a greater power allocation coefficient according to the indication regarding power allocation coefficients. This generally applies to the case where data streams of respective user equipment are superposed in a liner manner.

Alternatively, as another example, the data demodulation unit 1104 may be further configured to demodulate the data transmitted in multi-user superposition transmission, by determining power allocation coefficients of respective user equipment according to the indication regarding power allocation coefficients to restore a constellation diagram. Specifically, the base station side and the user equipment side may reach agreement on which bits in the received symbol bit string the data stream of each user equipment corresponds to, such that the user equipment can determine the data stream of the target user equipment by restoring the constellation diagram. It should be understood that, this manner generally applies to the case where data streams of respective user equipment are superposed in a non-liner manner.

It should be understood that, similar to the above apparatuses 600 to 800 on the side of the user equipment, the apparatus 1100 on the side of the user equipment according to this embodiment may be an independent processing chip located on the side of the user equipment, and receive the common demodulation reference signal and the indication regarding power allocation coefficients from the base station though an external communication unit. Alternatively, the apparatus 1100 may be the user equipment itself, and in this case, the apparatus 1100 may further include a reception unit, which may be configured to receive the common demodulation reference signal and the indication regarding power allocation coefficients from the base station.

In order to facilitate understanding of the transmission manner of the demodulation reference signal according to the second embodiment of the present disclosure, the signaling interaction process between the base station side and the user equipment side in this embodiment is systematically described with reference to the flowchart shown in FIG. 12, which is a flowchart illustrating a signaling interaction process in the wireless communication system for multi-user superposition transmission according to the second embodiment of the present disclosure.

Figure 12:
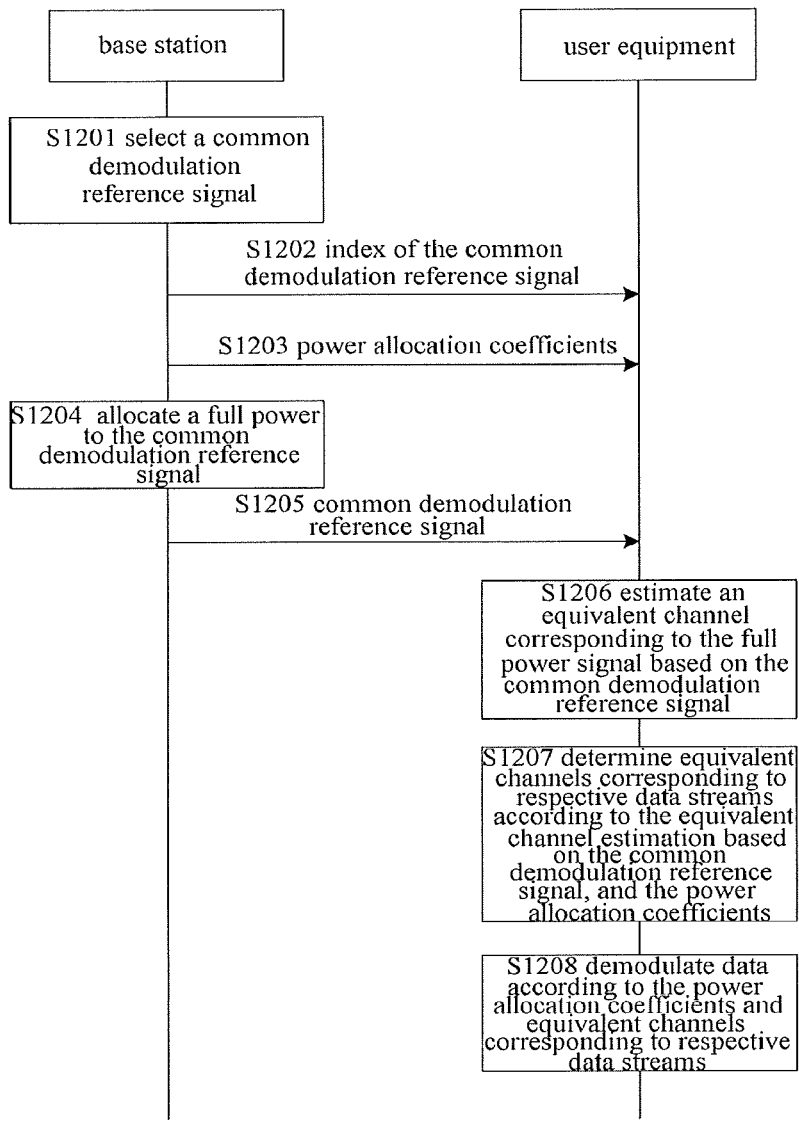
FIG. 12 is a flow chart illustrating a signaling interaction process in a wireless communication system for multi-user superposition transmission according to the second embodiment of the present disclosure.

As shown in FIG. 12, in step S1201, the base station may select a common demodulation reference signal for a group of user equipment for which multi-user superposition transmission is to be performed. In step S1202, the base station notifies an index of the common demodulation reference signal to the user equipment. It is to be noted that, for a fixed group of user equipment, the selected common demodulation reference signal is usually fixed, and thus it generally only needs to notify the user equipment of the index once. For example, it is assumed that there are four demodulation reference signals $s_0$, $s_1$, $s_2$ and $s_3$, and the base station selects the user 0 and the user 1 to perform multi-user superposition transmission therefor to transmit encoded bit streams $c_0$ and $c_1$ respectively, and that the user 0 is the target user equipment, the common demodulation reference signal $s_0$ is selected for the user 0 and the user 1, and for example, the index of this demodulation reference signal is notified to the user equipment.

Next, in step S1203, the base station sets power allocation coefficients $\alpha_0$ and $\alpha_1$ for the user 0 and the user 1 respectively and notifies the power allocation coefficients to the user equipment, where $\alpha_1=1-\alpha_0$. A modulated symbol stream transmitted in multi-user superposition transmission is denoted as x, which may be a linear superposition result or a non-linear superposition result. Then, in step S1204, the base station allocates a full power allocation coefficient 1 to the common demodulation reference signal $s_0$, and in step S1205, the base station transmits the common demodulation reference signal $s_0$ to the user equipment. Specifically, the base station inserts $s_0$ into the superposed modulated symbol stream x to obtain a symbol string x', precodes the symbol string x' and maps it onto a time-frequency resource unit in an OFDM symbol for transmission.

Then, in step S1206, the user 0 and the user 1 acquire an equivalent channel h corresponding to the symbol stream x based on the common demodulation reference signal $s_0$, and in step S1207, the user 0 and the user 1 acquire equivalent channels corresponding to data streams thereof according to the power allocation coefficients $\alpha_0$ and $\alpha_1$, i.e., $h_0=\alpha_0 h$, $h_1=\alpha_1 h$.

Finally, in step S1208, the user equipment may preferentially demodulate the data stream having a greater power allocation coefficient according to the notification of the power allocation coefficients. In a case that this data stream is not the data stream of the target user 0, the user 0 may eliminate the data stream $c_1$ of the user 1 as an interference from the received signal after demodulating the data stream $c_1$ according to the equivalent channel $h_1$ of the user 1. After that, the user 0 demodulates the data stream $c_0$ of itself based on the equivalent channel $h_0$. Alternatively, the user equipment may also restore a constellation diagram based on the power allocation coefficients, and demodulate the data streams corresponding to the user equipment based on the constellation diagram.

It is to be noted that the signaling interaction process shown in FIG. 12 is merely an example but not limitation, and those skilled in the art may also modify the above process in accordance with the principles of the present disclosure. For example, in a case that configuration of the group of user equipment for which the multi-user superposition transmission is to be performed is fixed, and the base station side and the user equipment side have reached an agreement on the common demodulation reference signal to be used for the group of user equipment in advance, the side of the base station may not select the common demodulation reference signal for the target user equipment group and notify the user equipment of the index of the common demodulation reference signal, that is, processing in steps S1201 and S1202 may be omitted.

Functional configuration examples of the apparatus on the side of the base station side and the apparatus on the side of the user equipment in the wireless communication system have been respectively described above with reference to FIGS. 1 to 12. However, it should be understood that the above description is merely an example but not limitation, and various functional modules described above may be added, deleted, combined, sub-combined or modified by those skilled in the art in accordance with the principles of the present disclosure, and all of such variations are considered to fall within the scope of the present disclosure.

Corresponding to the above apparatus embodiments, the present disclosure further provides the following method embodiments.

Figure 13:
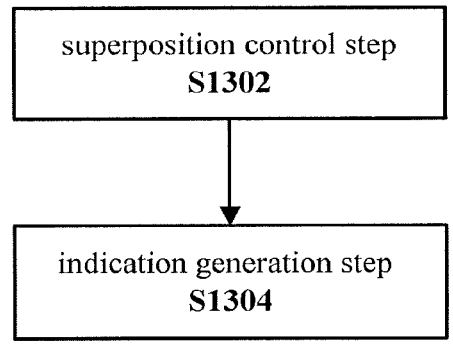
FIG. 13 is a flow chart illustrating a process example of a method applied at base station side in a wireless communication system for multi-user superposition transmission according to an embodiment of the present disclosure.

FIG. 13 is a flow chart illustrating a process example of a method applied at base station side in a wireless communication system for multi-user superposition transmission according to an embodiment of the present disclosure.

As shown in FIG. 13, the method starts at step S1302. In step S1302, the apparatus on the side of the base station inserts, into a data stream of each of a group of user equipment including multiple user equipment, a demodulation reference signal corresponding to the data stream of each user equipment, and superposes demodulation reference signals corresponding to data streams of respective user equipment, where a specific transmission power is allocated to the data stream of each of the multiple user equipment, so that the data streams of respective user equipment are transmitted to the multiple user equipment with same time-frequency resource, without using a multiple-input multiple-output performance gain and/or code division multiplexing.

Preferably, in step S1302, a specific transmission power may be allocated to the demodulation reference signal corresponding to the data stream of each of the multiple user equipment, and the demodulation reference signals corresponding to the data streams of respective user equipment may be superposed according to the allocated transmission powers. Preferably, the demodulation reference signals corresponding to the data streams of respective user equipment have different orthogonal codes, so that the demodulation reference signals corresponding to the data streams of respective user equipment are transmitted to the respective user equipment on same resource elements. Preferably, each of the multiple user equipment has only a single layer of data stream, and a demodulation reference signal which supports only a single-layer data stream is inserted into the data stream of each of the multiple user equipment. Preferably, the demodulation reference signals corresponding to the data streams of respective user equipment are superposed in a manner different from a manner in which the data streams of respective user equipment are superposed. In addition, the transmission power allocated to the demodulation reference signal corresponding to the data stream of each of the multiple user equipment is the same as the transmission power allocated to the data stream.

Then, the method proceeds to step S1304. In step S1304, for at least a first user equipment among the multiple user equipment, an indication regarding a demodulation reference signal corresponding to a data stream of other user equipment among the multiple user equipment is generated, to assist the first user equipment in demodulating data transmitted in the multi-user superposition transmission. Preferably, the indication may be included in physical layer signaling (e.g., DCI), high layer signaling (e.g., RRC signaling), or MAC signaling, or may be divided into different parts which are respectively included in physical layer signaling and high layer signaling.

Preferably, in step S1302, a reference signal group for the group of user equipment may be determined from multiple reference signal groups each including multiple demodulation reference signals. The number of demodulation reference signals included in the determined reference signal group is equal to the number of user equipment included in the group of user equipment, and preferably, the above indication further includes an index regarding the determined reference signal group. Further preferably, the indication may further include information on a demodulation reference signal for the first user equipment in the determined reference signal group. Preferably, the indication further includes at least one bit for indicating to the user equipment an indication manner regarding the demodulation reference signal, the indication manner including a demodulation reference signal group indication manner and a conventional demodulation reference signal indication manner. In addition, preferably, the conventional demodulation reference signal indication manner is used for at least second user equipment (for example, user equipment farthest from the base station) in the group of user equipment.

In addition, a storage unit may be read to determine the reference signal group for the group of user equipment. The storage unit stores information on a demodulation reference signal group set which includes multiple reference signal groups, where the multiple demodulation reference signals included in each demodulation reference signal group are orthogonal to each other in a code division manner.

In addition, preferably, in a case that the method 1300 is performed in the base station, the method may further include a step for transmitting the superposed demodulation reference signal and the indication to at least the first user equipment.

It is to be noted that, the embodiment of the method 1300 described here corresponds to the above embodiment of the apparatus 200, thus contents which are not described here in detail can be referred to the corresponding description above, and are not repeated here.

Figure 14:
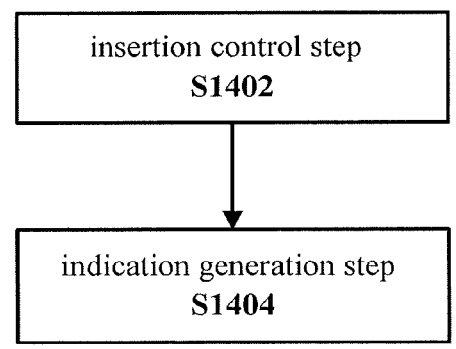
FIG. 14 is a flow chart illustrating a process example of a method applied at base station side in a wireless communication system for multi-user superposition transmission according to another embodiment of the present disclosure.

FIG. 14 is a flow chart illustrating a process example of a method applied at base station side in a wireless communication system for multi-user superposition transmission according to another embodiment of the present disclosure.

As shown in FIG. 14, a method 1400 starts at step S1402. In step S1402, an apparatus at base station side inserts a common demodulation reference signal into a superposed data stream of multiple user equipment. Preferably, in step S1402, a full transmission power is allocated to the common demodulation reference signal.

Then, the method 1400 proceeds to step S1404. In step S1404, for at least a first user equipment among the multiple user equipment, an indication regarding power allocation coefficients corresponding to data streams of the multiple user equipment is generated to assist the first user equipment in demodulating data transmitted in multi-user superposition transmission.

In addition, preferably, in a case that the method 1400 is performed in the base station, the method may further include a step for transmitting the common demodulation reference signal and the indication to at least the first user equipment.

It is to be noted that, the embodiment of the method 1400 described here corresponds to the above embodiment of the apparatus 1000, thus contents which are not described here in detail can be referred to the corresponding description above, and are not repeated here.

Figure 15:
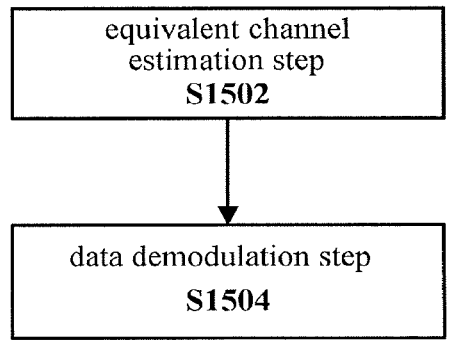
FIG. 15 is a flow chart illustrating a process example of a method applied at user equipment side in a wireless communication system for multi-user superposition transmission according to an embodiment of the present disclosure.

FIG. 15 is a flow chart illustrating a process example of a method applied at user equipment side in a wireless communication system for multi-user superposition transmission according to an embodiment of the present disclosure.

As shown in FIG. 15, a method 1500 starts at step S1502. In step S1502, the apparatus on the side of the user equipment estimates, based on a superposed demodulation reference signal regarding a target user equipment and other user equipment and an indication regarding a demodulation reference signal of the other user equipment from a base station, an equivalent channel corresponding to a data stream of the target user equipment and an equivalent channel corresponding to a data stream of the other user equipment, where a demodulation reference signal regarding the target user equipment and the demodulation reference signal regarding the other user equipment are respectively inserted into data streams of respective user equipment, and the data streams of respective user equipment are transmitted by the base station at specific transmission powers with same time-frequency resource, without using a multiple-input multiple-output performance gain and/or code division multiplexing. Preferably, the indication is acquired according to physical layer signaling and/or MAC layer signaling and/or high-level signaling from the base station. In addition, preferably, specific transmission powers are allocated to demodulation reference signals regarding respective user equipment, and the superposed demodulation reference signal is obtained by superposition according to the allocated transmission powers. Preferably, the demodulation reference signals regarding respective user equipment are superposed in a manner different from a manner in which the data streams of respective user equipment are superposed, and the transmission power allocated to the demodulation reference signal regarding each user equipment is the same as the transmission power allocated to the data stream of the user equipment. Preferably, demodulation reference signals regarding respective user equipment have different orthogonal codes, so that the demodulation reference signals regarding respective user equipment are transmitted to respective user equipment on same resource elements. In addition, preferably, each user equipment has only a single layer of data stream, and a demodulation reference signal supporting only a single-layer data stream is inserted into the data stream of each user equipment.

Next, the method 1500 proceeds to step S1504. In step S1504, data transmitted in multi-user superposition transmission is demodulated according to the estimated equivalent channels.

Preferably, the method 1500 may further include a step of determining power allocation coefficients of the target user equipment and the other user equipment according to the estimated equivalent channels, and in step 1504, data transmitted in multi-user superposition transmission may be demodulated according to the determined power allocation coefficients. Preferably, in step S1504, a constellation diagram may be restored based on the determined power allocation coefficients to demodulate data transmitted in multi-user superposition transmission.

In addition, preferably, the method 1500 may further include a step of determining a data demodulation order of the target user equipment and the other user equipment according to the estimated equivalent channels, and in step S1504, data transmitted in multi-user superposition transmission may be demodulated according to the determined data demodulation order. Preferably, in step S1504, data transmitted in multi-user superposition transmission may be demodulated in a non-linear interference cancellation manner according to the determined data demodulation order.

Preferably, in step S1502, an index of a reference signal group for a group of user equipment including the target user equipment and the other user equipment may be determined according to the indication, where the number of demodulation reference signals in the reference signal group is greater than or equal to the number of user equipment in the group of user equipment. In addition, preferably, in step S1502, the demodulation reference signal regarding the other user equipment is determined according to the index and the information on the demodulation reference signal regarding the target user equipment included in the indication, and in step S1504, data transmitted in multi-user superposition transmission is demodulated according to the determined demodulation reference signals.

Preferably, in step S1502, an indication manner of the demodulation reference signal regarding the target user equipment is determined according to the indication. The indication manner includes a demodulation reference signal group indication manner and a conventional demodulation reference signal indication manner, and the indication manner of the demodulation reference signal of at least one of the group of user equipment is the conventional demodulation reference signal indication manner. Preferably, a demodulation reference signal which supports only a single-layer data stream may be selected for the user equipment to which the demodulation reference signal group indication manner is to be applied.

In addition, preferably, in a case that the method 1500 is performed in the user equipment, the method may further include a step for receiving the superposed demodulation reference signal and the above indication from the base station.

It is to be noted that, the embodiment of the method 1500 described here corresponds to the above embodiments of the apparatuses 600 to 800, thus contents which are not described here in detail can be referred to the corresponding description above, and are not repeated here.

Figure 16:
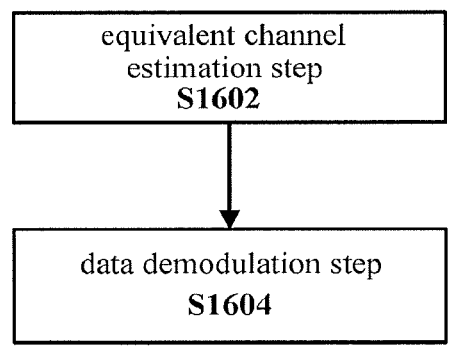
FIG. 16 is a flow chart illustrating a process example of a method applied at user equipment side in a wireless communication system for multi-user superposition transmission according to another embodiment of the present disclosure.

FIG. 16 is a flow chart illustrating a process example of a method applied at user equipment side in a wireless communication system for multi-user superposition transmission according to another embodiment of the present disclosure.

As shown in FIG. 16, a method 1600 starts at step S1602. In step S1602, an equivalent channel corresponding to a superposed data stream from a base station is estimated according to a common demodulation reference signal, which is inserted into the superposed data stream, from the base station.

Then, the method 1600 proceeds to step S1604. In step S1604, data transmitted in multi-user superposition transmission is demodulated according to the estimated equivalent channel and an indication regarding power allocation coefficients of the target user equipment and other user equipment from the base station.

Preferably, in step S1604, an equivalent channel corresponding to a data stream of the target user equipment and an equivalent channel corresponding to a data stream of the other user equipment are determined according to the estimated equivalent channel and the indication, and data transmitted in multi-user superposition transmission is demodulated according to the determined equivalent channels of respective user equipment. Preferably, in step S1604, data transmitted in multi-user superposition transmission is demodulated in a non-linear interference cancellation manner, by preferentially demodulating a data stream corresponding to user equipment with a greater power allocation coefficient according to the indication. In addition, preferably, in step S1604, data transmitted in multi-user superposition transmission is demodulated by determining power allocation coefficients of respective user equipment according to the indication so as to restore a constellation diagram.

In addition, preferably, in a case that the method 1600 is performed in the user equipment, the method may further include a step for receiving the common demodulation reference signal and the above indication from the base station.

It is to be noted that, the embodiment of the method 1600 described here corresponds to the above embodiment of the apparatus 1100, thus contents which are not described here in detail can be referred to the corresponding description above, and are not repeated here.

Although process examples of the methods in the wireless communication system according to the embodiments of the present disclosure have been described above, it should be understood that these are merely examples but not limitations, and the above embodiments can be modified by those skilled in the art in accordance with the principles of the present disclosure. For example, steps in various embodiments may be added, deleted or combined, and all of such modifications are considered to fall within the scope of the present disclosure.

In addition, according to an embodiment of the present disclosure, it is further provided an electronic device which may include a transceiver and one or more processors. The one or more processors may be configured to perform the above methods or functions of corresponding units in the wireless communication system according to the embodiments of the present disclosure.

It should be understood that machine-executable instructions in a storage medium and a program product according to the embodiments of the present disclosure may be also configured to execute the methods corresponding to the apparatus embodiments described above, thus contents which are not described in detail may be referred to foregoing description at corresponding positions, which are not described repeatedly here anymore.

Accordingly, a storage medium on which the above program product storing machine executable instructions is carried is also included in the disclosure. The storage medium includes but not limited to a floppy disk, an optical disk, a magneto-optical disk, a storage card, a memory rod and the like.

Furthermore, it shall be noted that the foregoing series of processes and apparatuses can also be embodied in software and/or firmware. In the case of being embodied in software and/or firmware, a program constituting the software is installed from a storage medium or a network to a computer with a dedicated hardware structure, e.g., a general purpose personal computer 1700 illustrated in FIG. 17, which can perform various functions when various programs are installed thereon.

Figure 17:
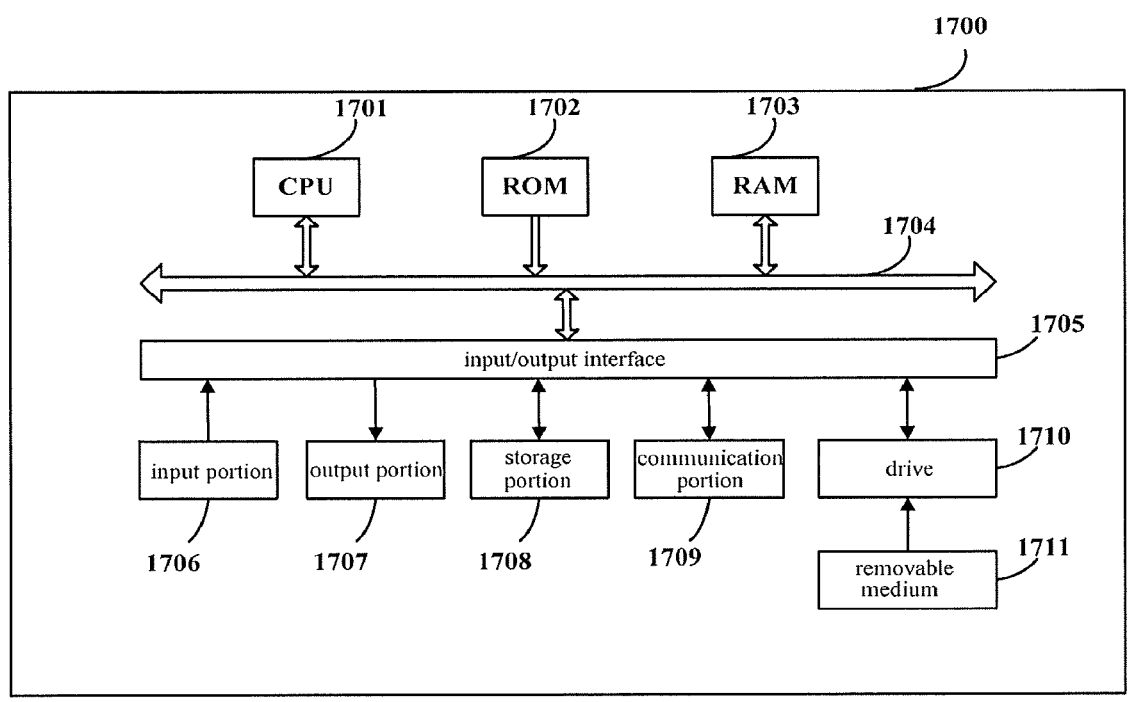
FIG. 17 is a block diagram of an exemplary configuration of a personal computer serving as an information processing device which can be used in the embodiments of the present disclosure.

In FIG. 17, a Central Processing Unit (CPU) 1701 performs various processes according to a program stored in a Read Only Memory (ROM) 1702 or loaded from a storage portion 1708 into a Random Access Memory (RAM) 1703 in which data required when the CPU 1701 performs the various processes is also stored as needed.

The CPU 1701, the ROM 1702 and the RAM 1703 are connected to each other via a bus 1704 to which an input/output interface 1705 is also connected.

The following components are connected to the input/output interface 1705: an input portion 1706 including a keyboard, a mouse, etc.; an output portion 1707 including a display, e.g., a Cathode Ray Tube (CRT), a Liquid Crystal Display (LCD), etc., a speaker, etc.; a storage portion 1708 including a hard disk, etc.; and a communication portion 1709 including a network interface card, e.g., an LAN card, a modem, etc. The communication portion 1709 performs a communication process over a network, e.g., the Internet.

A drive 1710 is also connected to the input/output interface 1705 as needed. A removable medium 1711, e.g., a magnetic disk, an optical disk, an magneto optical disk, a semiconductor memory, etc., can be installed on the drive 1710 as needed so that a computer program fetched therefrom can be installed into the storage portion 1708 as needed.

In the case that the foregoing series of processes are performed in software, a program constituting the software is installed from a network, e.g., the Internet, etc., or a storage medium, e.g., the removable medium 1711, etc.

Those skilled in the art shall appreciate that such a storage medium will not be limited to the removable medium 1711 illustrated in FIG. 17 in which the program is stored and which is distributed separately from the apparatus to provide a user with the program. Examples of the removable medium 1711 include a magnetic disk (including a Floppy Disk (a registered trademark)), an optical disk (including Compact Disk-Read Only memory (CD-ROM) and a Digital Versatile Disk (DVD)), a magneto optical disk (including a Mini Disk (MD) (a registered trademark)) and a semiconductor memory. Alternatively the storage medium can be the ROM 1702, a hard disk included in the storage portion 1708, etc., in which the program is stored and which is distributed together with the apparatus including the same to the user.

Application examples according to the present disclosure are described below with reference to FIGS. 18 to 21.

Application Examples Regarding Base Station

First Application Example

Figure 18:
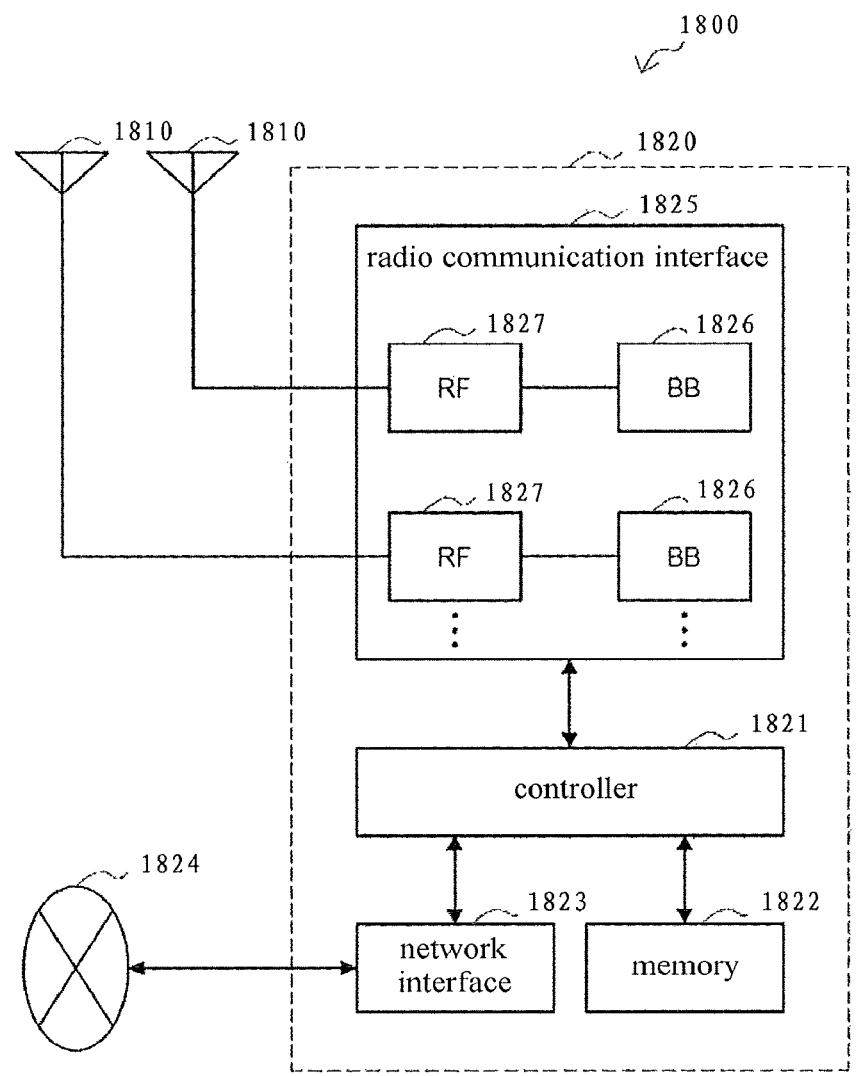
FIG. 18 is a block diagram illustrating a first example of a schematic configuration of an evolved Node B (eNB) to which the technology of the present disclosure may be applied.

FIG. 18 is a block diagram illustrating a first example of a schematic configuration of an eNB to which the technology of the present disclosure is applicable. eNB 1800 includes one or more antennas 1810 and a base station device 1820. The base station device 1820 and each antenna 1810 may be connected with each other via radio frequency (RF) cable.

Each of the antennas 1810 includes one or more antenna element (such as the multiple antenna elements included in the multiple-input multiple-output (MIMO) antenna), and is used for the base station device 1820 to transmit and receive radio signals. As show in FIG. 18, the eNB 1800 may include multiple antennas 1810. For example, the multiple antennas 1810 may be compatible with the multiple frequency bands used by the eNB 1800. Although FIG. 18 shows an example in which the eNB 1800 includes multiple antennas 810, the eNB 1800 may also include a single antenna 1810.

The base station device 1820 includes a controller 1821, a memory 1822, a network interface 1823 and a radio communication interface 1825.

For example, the controller 1821 may be a CPU or DSP, and performs various functions of a higher layer of the base station device 1820. For example, the controller 1821 generates a data packet based on the data in signals processed by the radio communication interface 1825, and transfers the generated packet via the network interface 1823. The controller 1821 may bundle data from multiple baseband processors to generate bundled packet, and transfer the generated bundled packet. The controller 1821 may have logical functions to perform control such as radio resource control, radio bearer control, mobility management, admission control and scheduling. The control may be performed in cooperation with an eNB or a core network node in the vicinity. The memory 1822 includes RAM and ROM, and stores the program that is executed by the controller 1821 and various types of control data (such as a terminal list, transmission power data and scheduling data).

The network interface 1823 is a communication interface for connecting the base station device 1820 to a core network 1824. The controller 1821 may communication with a core network node or another eNB via the network interface 1823. In this case, the eNB 1800 and the core network node or other eNB may be connected with each other via a logical interface (such as an S1 interface and X2 interface). The network interface 1823 may also be a wired communication interface or a radio communication interface for radio backhaul. If the network interface 1823 is a radio communication interface, the network interface 1823 may use a higher frequency band for radio communication than that used by the radio communication interface 1825.

The radio communication interface 1825 supports any cellular communication scheme (such as Long Term Evolution (LTE) and LTE-Advanced), and provides radio connection to a terminal located in a cell of the eNB 1800 via the antenna 1810. The radio communication interface 1825 may generally include for example a baseband (BB) processor 1826 and an RF circuit 1827. The BB processor 1826 may perform for example coding/decoding, modulation/demodulation and multiplexing/de-multiplexing, and performs various types of signal processing of layers (for example L1, media access control (MAC), radio link control (RLC) and a packet data convergence protocol (PDCP)). Instead of the controller 1821, the BB processor 1826 may have some or all of the above logical functions. The BB processor 1826 may be a memory storing a communication control program, or a module including a processor and a related circuit configured to execute the program. Updating the program may change the functions of the BB processor 1826. The module may be a card or blade that is inserted into a slot of the base station device 1820. Alternatively, the module may be a chip mounted on the card or the blade. The RF circuit 1827 may include for example a mixer, a filter and an amplifier, and transmit and receive radio signals via the antenna 1810.

As shown in FIG. 18, the radio communication interface 1825 may include multiple BB processors 1826. For example, the multiple BB processors 1826 may be compatible with the multiple frequency bands used by the eNB 1800. As shown in FIG. 18, the radio communication interface 1825 may include multiple RF circuits 1827. For example, the multiple RF circuits 1827 may be compatible with multiple antenna elements. Although an example in which the radio communication interface 1825 includes multiple BB processors 1826 and multiple RF circuits 1827 is shown in FIG. 18, the radio communication interface 1825 may also include a single BB processor 1826 or a single RF circuit 1827.

Second Application Example

Figure 19:
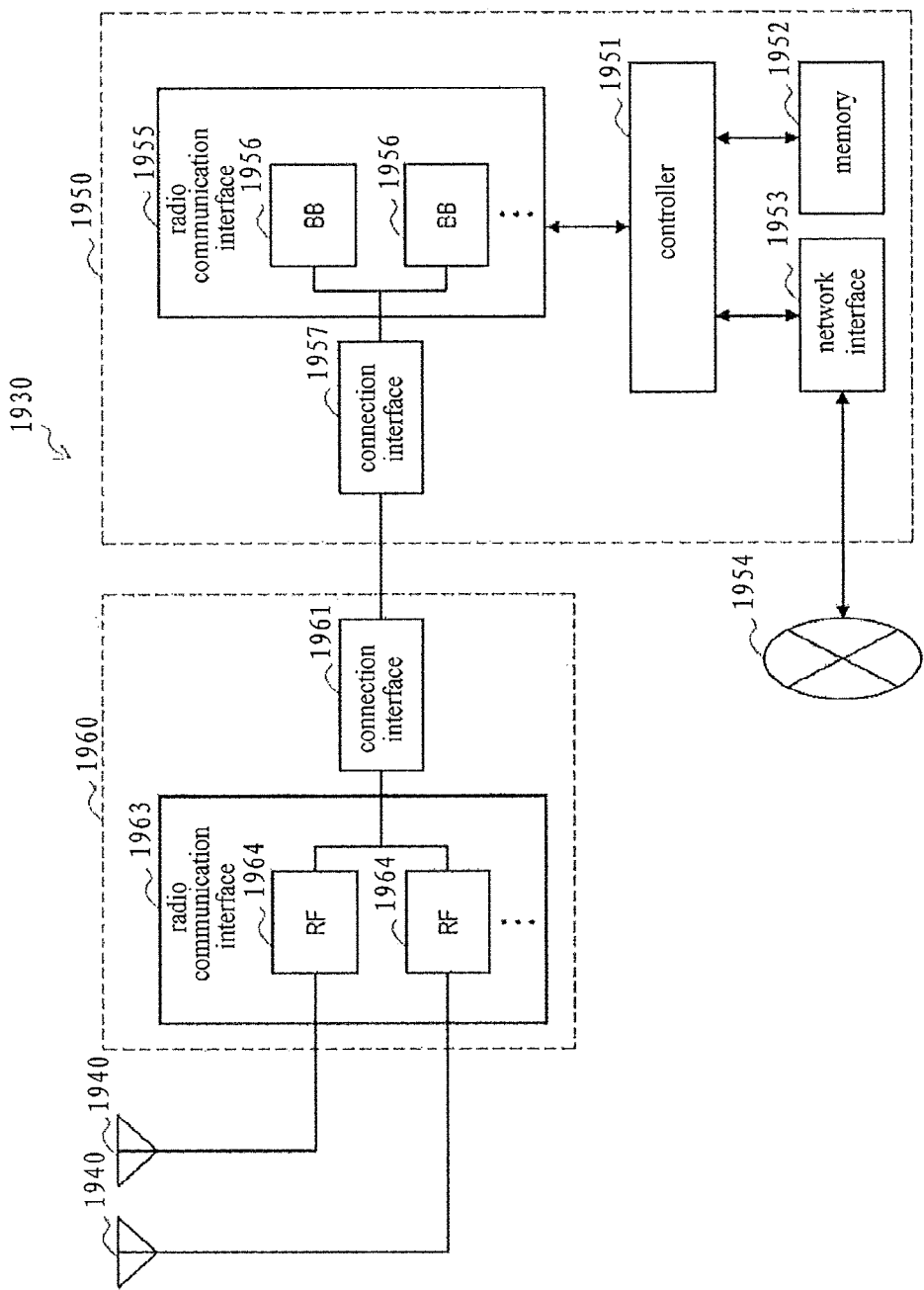
FIG. 19 is a block diagram illustrating a second example of a schematic configuration of an eNB to which the technology of the present disclosure may be applied.

FIG. 19 is a block diagram illustrating a second example of a schematic configuration of an eNB to which the technology of the present disclosure may be applied. An eNB 1930 includes one or more antennas 1940, a base station device 1950, and an RRH 1960. Each antenna 1940 and the RRH 1960 may be connected to each other via an RF cable. The base station device 1950 and the RRH 1960 may be connected to each other via a high speed line such as an optical fiber cable.

Each of the antennas 1940 includes a single or multiple antenna elements (such as multiple antenna elements included in an MIMO antenna), and is used for the RRH 1960 to transmit and receive radio signals. The eNB 1930 may include the multiple antennas 1940, as illustrated in FIG. 19. For example, the multiple antennas 1940 may be compatible with multiple frequency bands used by the eNB 1930. Although FIG. 19 illustrates the example in which the eNB 1930 includes the multiple antennas 1940, the eNB 1930 may also include a single antenna 1940.

The base station device 1950 includes a controller 1951, a memory 1952, a network interface 1953, a radio communication interface 1955, and a connection interface 1957. The controller 1951, the memory 1952, and the network interface 1953 are the same as the controller 1821, the memory 1822, and the network interface 1823 described with reference to FIG. 18.

The radio communication interface 1955 supports any cellular communication scheme such as LTE and LTE-Advanced, and provides radio communication to a terminal positioned in a sector corresponding to the RRH 1960 via the RRH 1960 and the antenna 1940. The radio communication interface 1955 may typically include, for example, a BB processor 1956. The BB processor 1956 is the same as the BB processor 1826 described with reference to FIG. 18, except the BB processor 1956 is connected to the RF circuit 1964 of the RRH 1960 via the connection interface 1957. The radio communication interface 1955 may include the multiple BB processors 1956, as illustrated in FIG. 19. For example, the multiple BB processors 1956 may be compatible with multiple frequency bands used by the eNB 1930. Although FIG. 19 illustrates the example in which the radio communication interface 1955 includes the multiple BB processors 1956, the radio communication interface 1955 may also include a single BB processor 1956.

The connection interface 1957 is an interface for connecting the base station device 1950 (radio communication interface 1955) to the RRH 1960. The connection interface 1957 may also be a communication module for communication in the above-described high speed line that connects the base station device 1950 (radio communication interface 1955) to the RRH 1960.

The RRH 1960 includes a connection interface 1961 and a radio communication interface 1963.

The connection interface 1961 is an interface for connecting the RRH 1960 (radio communication interface 1963) to the base station device 1950. The connection interface 1961 may also be a communication module for communication in the above-described high speed line.

The radio communication interface 1963 transmits and receives radio signals via the antenna 1940. The radio communication interface 1963 may typically include, for example, the RF circuit 1964. The RF circuit 1964 may include, for example, a mixer, a filter, and an amplifier, and transmits and receives radio signals via the antenna 1940. The radio communication interface 1963 may include multiple RF circuits 1964, as illustrated in FIG. 19. For example, the multiple RF circuits 1964 may support multiple antenna elements. Although FIG. 19 illustrates the example in which the radio communication interface 1963 includes the multiple RF circuits 1964, the radio communication interface 1963 may also include a single RF circuit 1964.

In the eNB 1800 and the eNB 1930 illustrated in FIGS. 18 and 19, the transmission units in the apparatus 200 and the apparatus 1000 may be implemented by the radio communication interface 1825, and the radio communication interface 1955 and/or the radio communication interface 1963. At least a part of the functions of the superposition control unit, the insertion control unit and the indication generation unit may also be implemented by the controller 1821 and the controller 1951.

Application Examples Regarding User Equipment

First Application Example

Figure 20:
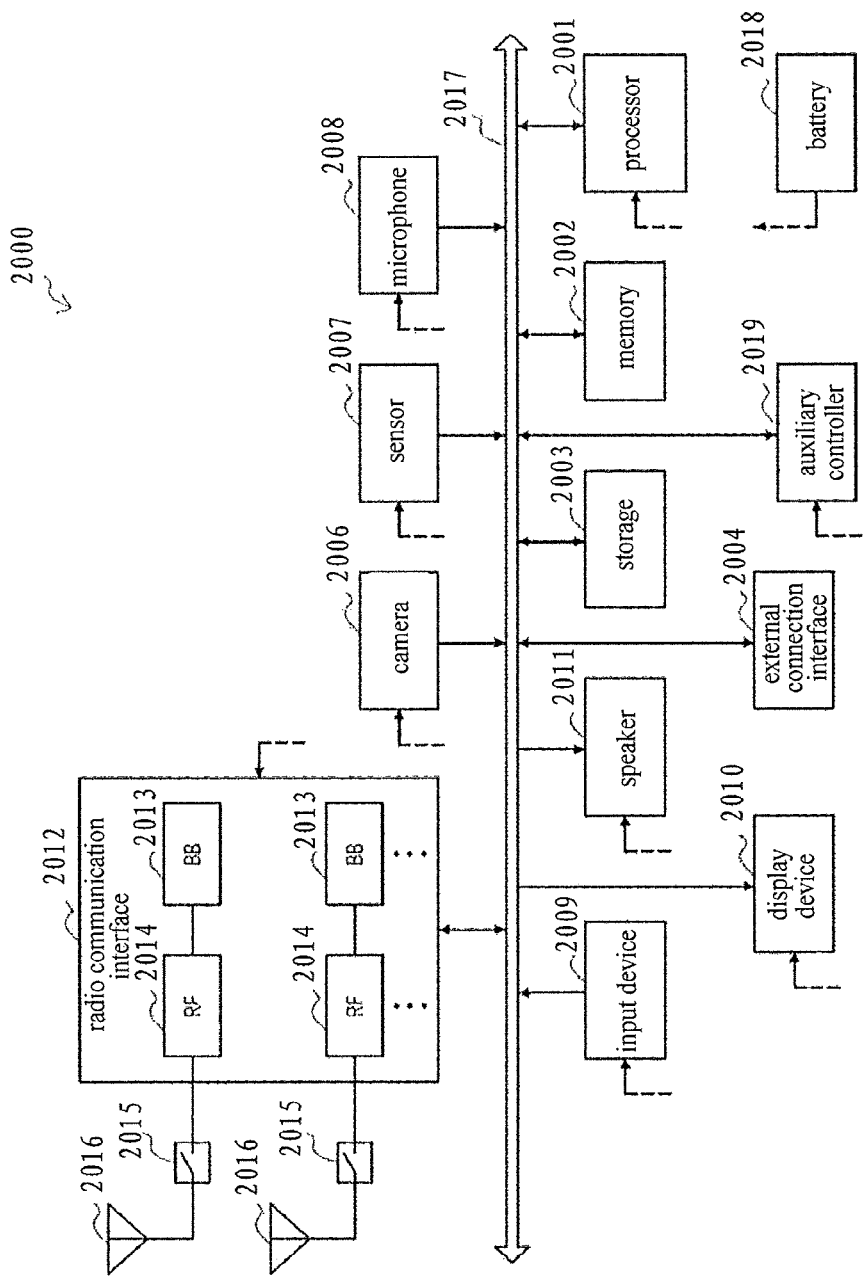
FIG. 20 is a block diagram illustrating an example of a schematic configuration of a smartphone to which the technology of the present disclosure may be applied.

FIG. 20 is a block diagram illustrating an example of a schematic configuration of a smartphone 2000 to which the technology of the present disclosure may be applied. The smartphone 2000 includes a processor 2001, a memory 2002, a storage 2003, an external connection interface 2004, a camera 2006, a sensor 2007, a microphone 2008, an input device 2009, a display device 2010, a speaker 2011, a radio communication interface 2012, one or more antenna switches 2015, one or more antennas 2016, a bus 2017, a battery 2018, and an auxiliary controller 2019.

The processor 2001 may be, for example, a CPU or a system on a chip (SoC), and controls functions of an application layer and another layer of the smartphone 2000. The memory 2002 includes RAM and ROM, and stores a program that is executed by the processor 2001, and data. The storage 2003 may include a storage medium such as a semiconductor memory and a hard disk. The external connection interface 2004 is an interface for connecting an external device such as a memory card and a universal serial bus (USB) device to the smartphone 2000.

The camera 2006 includes an image sensor such as a charge coupled device (CCD) and a complementary metal oxide semiconductor (CMOS), and generates a captured image. The sensor 2007 may include a group of sensors such as a measurement sensor, a gyro sensor, a geomagnetic sensor, and an acceleration sensor. The microphone 2008 converts sounds that are input to the smartphone 2000 to audio signals. The input device 2009 includes, for example, a touch sensor configured to detect touch onto a screen of the display device 2010, a keypad, a keyboard, a button, or a switch, and receives an operation or an information input from a user. The display device 2010 includes a screen such as a liquid crystal display (LCD) and an organic light-emitting diode (OLED) display, and displays an output image of the smartphone 2000. The speaker 2011 converts audio signals that are output from the smartphone 2000 to sounds.

The radio communication interface 2012 supports any cellular communication scheme such as LET and LTE-Advanced, and performs radio communication. The radio communication interface 2012 may typically include, for example, a BB processor 2013 and an RF circuit 2014. The BB processor 2013 may perform, for example, encoding/decoding, modulating/demodulating, and multiplexing/demultiplexing, and performs various types of signal processing for radio communication. Meanwhile, the RF circuit 2014 may include, for example, a mixer, a filter, and an amplifier, and transmits and receives radio signals via the antenna 2016. The radio communication interface 2012 may be a one chip module having the BB processor 2013 and the RF circuit 2014 integrated thereon. The radio communication interface 2012 may include the multiple BB processors 2013 and the multiple RF circuits 2014, as illustrated in FIG. 20. Although FIG. 20 illustrates the example in which the radio communication interface 2012 includes the multiple BB processors 2013 and the multiple RF circuits 2014, the radio communication interface 2012 may also include a single BB processor 2013 or a single RF circuit 2014.

Furthermore, in addition to a cellular communication scheme, the radio communication interface 2012 may support another type of radio communication scheme such as a short-distance wireless communication scheme, a near field communication scheme, and a radio local area network (LAN) scheme. In that case, the radio communication interface 2012 may include the BB processor 2013 and the RF circuit 2014 for each radio communication scheme.

Each of the antenna switches 2015 switches connection destinations of the antennas 2016 among multiple circuits (such as circuits for different radio communication schemes) included in the radio communication interface 2012.

Each of the antennas 2016 includes a single or multiple antenna elements (such as multiple antenna elements included in an MIMO antenna), and is used for the radio communication interface 2012 to transmit and receive radio signals. The smartphone 2000 may include the multiple antennas 2016, as illustrated in FIG. 20. Although FIG. 20 illustrates the example in which the smartphone 2000 includes the multiple antennas 2016, the smartphone 2000 may also include a single antenna 2016.

Furthermore, the smartphone 2000 may include the antenna 2016 for each radio communication scheme. In that case, the antenna switches 2015 may be omitted from the configuration of the smartphone 2000.

The bus 2017 connects the processor 2001, the memory 2002, the storage 2003, the external connection interface 2004, the camera 2006, the sensor 2007, the microphone 2008, the input device 2009, the display device 2010, the speaker 2011, the radio communication interface 2012, and the auxiliary controller 20120 to each other. The battery 2018 supplies power to blocks of the smartphone 2000 illustrated in FIG. 20 via feeder lines, which are partially shown as dashed lines in the figure. The auxiliary controller 2019 operates a minimum necessary function of the smartphone 2000, for example, in a sleep mode.

In the smartphone 2000 illustrated in FIG. 20, the reception units in the apparatuses 600 to 800, and 1100 may be implemented by the radio communication interface 2012. At least a part of the functions of the equivalent channel estimation unit, the data demodulation unit, the power allocation coefficient determination unit and the demodulation order determination unit may also be implemented by the processor 2001 or the auxiliary controller 2019.

Second Application Example

Figure 21:
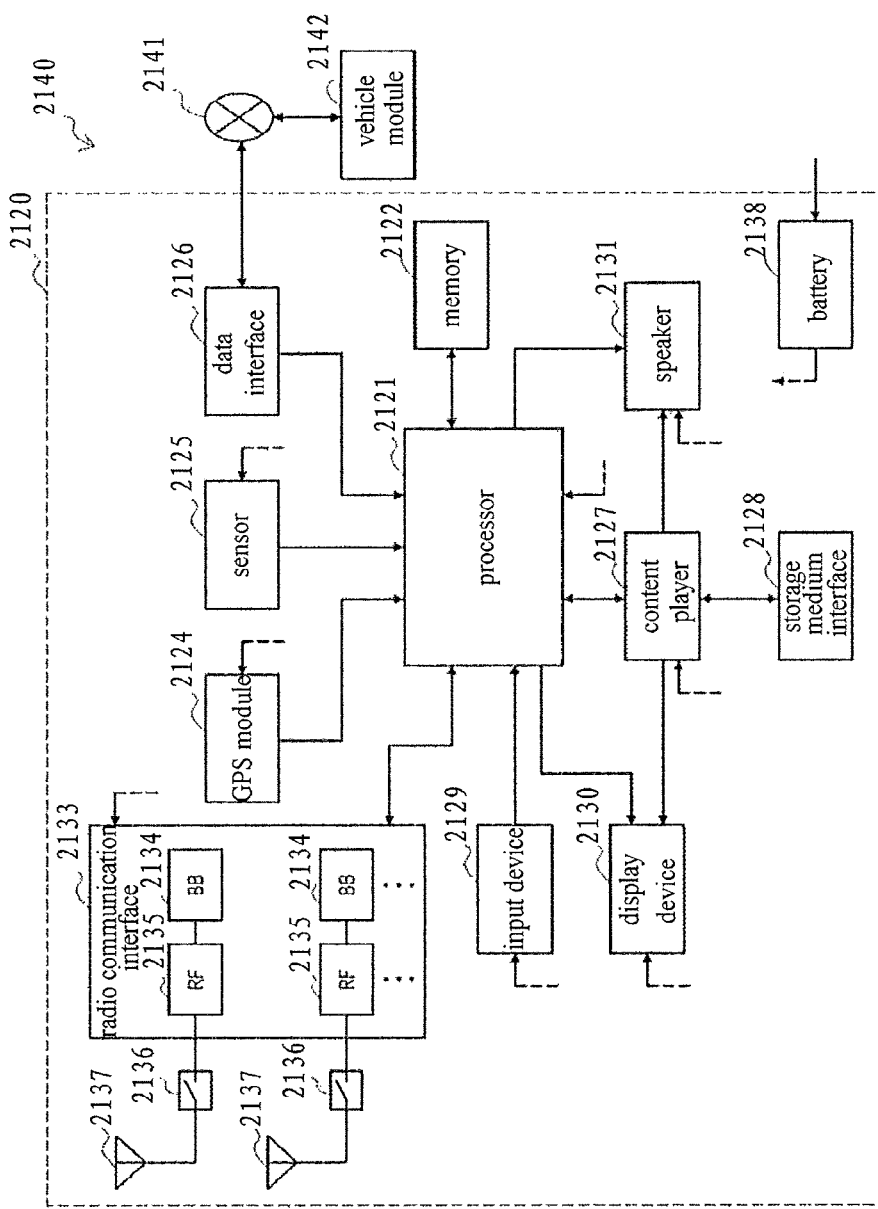
FIG. 21 is a block diagram illustrating an example of a schematic configuration of a car navigation apparatus to which the technology of the present disclosure may be applied.

FIG. 21 is a block diagram illustrating an example of a schematic configuration of a car navigation apparatus 2120 to which the technology of the present disclosure may be applied. The car navigation apparatus 2120 includes a processor 2121, a memory 2122, a global positioning system (GPS) module 2124, a sensor 2125, a data interface 2126, a content player 2127, a storage medium interface 2128, an input device 2129, a display device 2130, a speaker 2131, a radio communication interface 2133, one or more antenna switches 2136, one or more antennas 2137, and a battery 2138.

The processor 2121 may be, for example, a CPU or a SoC, and controls a navigation function and another function of the car navigation apparatus 2120. The memory 2122 includes RAM and ROM, and stores a program that is executed by the processor 2121, and data.

The GPS module 2124 uses GPS signals received from a GPS satellite to measure a position (such as latitude, longitude, and altitude) of the car navigation apparatus 2120. The sensor 2125 may include a group of sensors such as a gyro sensor, a geomagnetic sensor, and an air pressure sensor. The data interface 2126 is connected to, for example, an in-vehicle network 2141 via a terminal that is not shown, and acquires data generated by the vehicle, such as vehicle speed data.

The content player 2127 reproduces content stored in a storage medium (such as a CD and a DVD) that is inserted into the storage medium interface 2128. The input device 2129 includes, for example, a touch sensor configured to detect touch onto a screen of the display device 2130, a button, or a switch, and receives an operation or an information input from a user. The display device 2130 includes a screen such as a LCD or an OLED display, and displays an image of the navigation function or content that is reproduced. The speaker 2131 outputs sounds of the navigation function or the content that is reproduced.

The radio communication interface 2133 supports any cellular communication scheme such as LTE and LTE-Advanced, and performs radio communication. The radio communication interface 2133 may typically include, for example, a BB processor 2134 and an RF circuit 2135. The BB processor 2134 may perform, for example, encoding/decoding, modulating/demodulating, and multiplexing/demultiplexing, and performs various types of signal processing for radio communication. Meanwhile, the RF circuit 2135 may include, for example, a mixer, a filter, and an amplifier, and transmits and receives radio signals via the antenna 2137. The radio communication interface 2133 may also be a one chip module that has the BB processor 2134 and the RF circuit 2135 integrated thereon. The radio communication interface 2133 may include the multiple BB processors 2134 and the multiple RF circuits 2135, as illustrated in FIG. 21. Although FIG. 21 illustrates the example in which the radio communication interface 2133 includes the multiple BB processors 2134 and the multiple RF circuits 2135, the radio communication interface 2133 may also include a single BB processor 2134 or a single RF circuit 2135.

Furthermore, in addition to a cellular communication scheme, the radio communication interface 2133 may support another type of radio communication scheme such as a short-distance wireless communication scheme, a near field communication scheme, and a radio LAN scheme. In that case, the radio communication interface 2133 may include the BB processor 2134 and the RF circuit 2135 for each radio communication scheme.

Each of the antenna switches 2136 switches connection destinations of the antennas 2137 among multiple circuits (such as circuits for different radio communication schemes) included in the radio communication interface 2133.

Each of the antennas 2137 includes a single or multiple antenna elements (such as multiple antenna elements included in an MIMO antenna), and is used for the radio communication interface 2133 to transmit and receive radio signals. The car navigation apparatus 2120 may include the multiple antennas 2137, as illustrated in FIG. 21. Although FIG. 21 illustrates the example in which the car navigation apparatus 2120 includes the multiple antennas 2137, the car navigation apparatus 2120 may also include a single antenna 2137.

Furthermore, the car navigation apparatus 2120 may include the antenna 2137 for each radio communication scheme. In that case, the antenna switches 2136 may be omitted from the configuration of the car navigation apparatus 2120.

The battery 2138 supplies power to blocks of the car navigation apparatus 2120 illustrated in FIG. 21 via feeder lines that are partially shown as dashed lines in the figure. The battery 2138 accumulates power supplied form the vehicle.

In the car navigation apparatus 2120 illustrated in FIG. 21, the reception units in the apparatuses 600 to 800, and 1100 may be implemented by the radio communication interface 2133. At least a part of the functions of the equivalent channel estimation unit, the data demodulation unit, the power allocation coefficient determination unit and the demodulation order determination unit may also be implemented by the processor 2121.

The technology of the present disclosure may also be realized as an in-vehicle system (or a vehicle) 2140 including one or more blocks of the car navigation apparatus 2120, the in-vehicle network 2141, and a vehicle module 2142. The vehicle module 2142 generates vehicle data such as vehicle speed, engine speed, and trouble information, and outputs the generated data to the in-vehicle network 2141.

Preferred embodiments of the disclosure have been described above with reference to the drawings, but the disclosure is not limited to the above examples of course. Those skilled in the art may devise various alternations and modifications within the scope of the appended claims, and it should be understood that these alternations and modifications would naturally fall within the technical scope of the disclosure.

For example, multiple functions included in one unit in the above embodiments may be implemented by separated devices. Alternatively, multiple functions implemented by multiple units in the above embodiments may be implemented by separated devices respectively. Furthermore, one of the above functions may be implemented by multiple units. Without saying, such configuration is included in the technical scope of the disclosure.

In this specification, the steps described in the flow charts include not only processes performed in the sequential order as described chronically, but also processes performed concurrently or separately but not necessarily chronically. Further, even in the steps processed chronically, without saying, the order can be appropriately changed.

Although the disclosure and the advantages thereof have been described in details, it shall be appreciated that various modifications, substitutions and variations can be made without departing from the spirit and scope of the disclosure as defined by the appended claims. Furthermore, the terms "include", "comprise" or any variants thereof in the embodiments of the disclosure are intended to encompass nonexclusive inclusion so that a process, method, article or apparatus including a series of elements includes both those elements and other elements which are not listed explicitly or an element(s) inherent to the process, method, article or apparatus. Without much more limitation, an element being defined by a sentence "include/comprise a(n) . . . " will not exclude presence of an additional identical element(s) in the process, method, article or apparatus including the element.

The invention claimed is:

1. An apparatus at base station side in a wireless communication system for multi-user superposition transmission, the apparatus comprising:
   a superposition control unit configured to insert, into a data stream of each user equipment in a group of user equipment comprising a plurality of user equipment, a demodulation reference signal corresponding to the data stream, and superpose demodulation reference signals corresponding to data streams of respective user equipment, wherein the superposition control unit allocates a specific transmission power to the data stream of each of the plurality of user equipment, so that the data streams of respective user equipment are transmitted to the plurality of user equipment with same time-frequency resource, without using a multiple-input multiple-output performance gain and/or code division multiplexing; and an indication generation unit configured to generate, for at least a first user equipment among the plurality of user equipment, an indication regarding a demodulation reference signal corresponding to a data stream of other user equipment among the plurality of user equipment, to assist the first user equipment in demodulating data transmitted in the multi-user superposition transmission, wherein the superposition control unit is further configured to allocate a specific transmission power to the demodulation reference signal corresponding to the data stream of each of the plurality of user equipment, and superpose the demodulation reference signals corresponding to the data streams of respective user equipment according to the allocated transmission powers such that each user equipment determines a data demodulation order for each of the plurality of user equipment according to the estimated equivalent channels, and demodulates the data transmitted in multi-user superposition transmission according to the determined data demodulation order.

2. The apparatus according to claim 1, wherein the demodulation reference signals corresponding to the data streams of respective user equipment have different orthogonal codes, so that the demodulation reference signals corresponding to the data streams of respective user equipment are transmitted to the respective user equipment on same resource elements.

3. The apparatus according to claim 2, wherein each of the plurality of user equipment has only a single layer of data stream, and the superposition control unit is configured to insert a demodulation reference signal which supports only a single-layer data stream into the data stream of each of the plurality of user equipment.

4. The apparatus according to claim 1, wherein the demodulation reference signals corresponding to the data streams of respective user equipment are superposed in a manner different from a manner in which the data streams of respective user equipment are superposed.

5. The apparatus according to claim 1, wherein the transmission power allocated to the demodulation reference signal corresponding to the data stream of each of the plurality of user equipment is the same as the transmission power allocated to the data stream.

6. The apparatus according to claim 1, wherein the indication is comprised in physical layer signaling.

7. The apparatus according to claim 1, wherein the apparatus is the base station, and the apparatus further comprises:

a transmission unit configured to transmit the superposed demodulation reference signal and the indication to at least the first user equipment.

8. An apparatus at user equipment side in a wireless communication system for multi-user superposition transmission, comprising:

an equivalent channel estimation unit configured to estimate, based on a superposed demodulation reference signal regarding the user equipment and other user equipment and an indication regarding a demodulation reference signal of the other user equipment, which are from a base station, an equivalent channel corresponding to a data stream of the user equipment and an equivalent channel corresponding to a data stream of the other user equipment, wherein a demodulation reference signal regarding the user equipment and the demodulation reference signal regarding the other user equipment are respectively inserted into data streams of respective user equipment, and the data streams of respective user equipment are transmitted by the base station at specific transmission powers with same time-frequency resource, without using a multiple-input multiple-output performance gain and/or code division multiplexing; and a data demodulation unit configured to demodulate data transmitted in multi-user superposition transmission according to the estimated equivalent channels, wherein specific transmission powers are allocated to demodulation reference signals regarding respective user equipment, and the superposed demodulation reference signal is obtained by superposition according to the allocated transmission powers; and a demodulation order determination unit configured to determine a data demodulation order of the user equipment and the other user equipment according to the estimated equivalent channels, wherein the data demodulation unit is further configured to demodulate the data transmitted in multi-user superposition transmission according to the determined data demodulation order.

9. The apparatus according to claim 8, wherein demodulation reference signals regarding respective user equipment have different orthogonal codes, so that the demodulation reference signals regarding respective user equipment are transmitted to the respective user equipment on same resource elements.

10. The apparatus according to claim 9, wherein each user equipment has only a single layer of data stream, and a demodulation reference signal supporting only a single-layer data stream is inserted into the data stream of each user equipment.

11. The apparatus according to claim 8, wherein the demodulation reference signals regarding respective user equipment are superposed in a manner different from a manner in which the data streams of respective user equipment are superposed.

12. The apparatus according to claim 8, wherein the transmission power allocated to the demodulation reference signal regarding each user equipment is the same as the transmission power allocated to the data stream of the user equipment.

13. The apparatus according to claim 8, wherein the equivalent channel estimation unit is further configured to acquire the indication according to physical layer signaling from the base station.

14. The apparatus according to claim 8, further comprising:

a power allocation coefficient determination unit configured to determine power allocation coefficients of the user equipment and the other user equipment according to the estimated equivalent channels, wherein the data demodulation unit is further configured to demodulate the data transmitted in multi-user superposition transmission according to the determined power allocation coefficients.

15. The apparatus according to claim 14, wherein the data demodulation unit is further configured to restore a constellation diagram based on the determined power allocation coefficients, to demodulate the data transmitted in multi-user superposition transmission.

16. The apparatus according to claim 8, wherein the data demodulation unit is further configured to demodulate the data transmitted in multi-user superposition transmission according to the determined data demodulation order in a non-linear interference cancellation manner.

17. The apparatus according to claim 8, wherein the apparatus is the user equipment, and the apparatus further comprises:
a reception unit configured to receive the superposed demodulation reference signal and the indication from the base station.

18. A method applied at base station side in a wireless communication system for multi-user superposition transmission, the method comprising:
inserting, into a data stream of each user equipment in a group of user equipment comprising a plurality of user equipment, a demodulation reference signal corresponding to the data stream, and superposing demodulation reference signals corresponding to data streams of respective user equipment, wherein a specific transmission power is allocated to the data stream of each of the plurality of user equipment, so that the data streams of respective user equipment are transmitted to the plurality of user equipment with same time-frequency resource, without using a multiple-input multiple-output performance gain and/or code division multiplexing; and
generating, for at least a first user equipment among the plurality of user equipment, an indication regarding a demodulation reference signal corresponding to a data stream of other user equipment among the plurality of user equipment, to assist the first user equipment in demodulating data transmitted in the multi-user superposition transmission, wherein the inserting includes allocating a specific transmission power to the demodulation reference signal corresponding to the data stream of each of the plurality of user equipment, and superposing the demodulation reference signals corresponding to the data streams of respective user equipment according to the allocated transmission powers such that each user equipment determines a data demodulation order for each of the plurality of user equipment according to the estimated equivalent channels, and demodulates the data transmitted in multi-user superposition transmission according to the determined data demodulation order.

19. A method applied at user equipment side in a wireless communication system for multi-user superposition transmission, comprising:
estimating, based on a superposed demodulation reference signal regarding the user equipment and other user equipment and an indication regarding a demodulation reference signal of the other user equipment, which are from a base station, an equivalent channel corresponding to a data stream of the user equipment and an equivalent channel corresponding to a data stream of the other user equipment, wherein a demodulation reference signal regarding the user equipment and the demodulation reference signal regarding the other user equipment are respectively inserted into data streams of respective user equipment, and the data streams of respective user equipment are transmitted by the base station at specific transmission powers with same time-frequency resource, without using a multiple-input multiple-output performance gain and/or code division multiplexing; and
demodulating data transmitted in multi-user superposition transmission according to the estimated equivalent channels, wherein specific transmission powers are allocated to demodulation reference signals regarding respective user equipment, and the superposed demodulation reference signal is obtained by superposition according to the allocated transmission powers;
determining, with a demodulation order determination unit, data demodulation order of the user equipment and the other user equipment according to the estimated equivalent channels; and
demodulating the data transmitted in multi-user superposition transmission according to the determined data demodulation order.

* * * * *